US012275064B2

(12) United States Patent
King et al.

(10) Patent No.: US 12,275,064 B2
(45) Date of Patent: Apr. 15, 2025

(54) METHOD OF DETERMINING A TOOL PATH FOR CONTROLLING A PRINTING TOOL

(71) Applicant: COMMONWEALTH SCIENTIFIC AND INDUSTRIAL RESEARCH ORGANISATION, Australian Capital Territory (AU)

(72) Inventors: Peter King, Clayton South (AU); Alejandro Vargas Uscategui, Clayton South (AU)

(73) Assignee: COMMONWEALTH SCIENTIFIC AND INDUSTRIAL RESEARCH ORGANISATION, Acton (AU)

(*) Notice: Subject to any disclaimer, the term of this patent is extended or adjusted under 35 U.S.C. 154(b) by 313 days.

(21) Appl. No.: 17/630,839

(22) PCT Filed: Jul. 30, 2020

(86) PCT No.: PCT/AU2020/050778
§ 371 (c)(1),
(2) Date: Jan. 27, 2022

(87) PCT Pub. No.: WO2021/016666
PCT Pub. Date: Feb. 4, 2021

(65) Prior Publication Data
US 2022/0266342 A1 Aug. 25, 2022

(30) Foreign Application Priority Data
Jul. 30, 2019 (AU) .................. 2019902709

(51) Int. Cl.
*B22F 10/85* (2021.01)
*B22F 10/25* (2021.01)
(Continued)

(52) U.S. Cl.
CPC .............. *B22F 10/85* (2021.01); *B22F 10/25* (2021.01); *B22F 10/38* (2021.01); *B22F 12/222* (2021.01);
(Continued)

(58) Field of Classification Search
CPC .......... B22F 10/85; B22F 10/25; B22F 10/38; B22F 12/222; B22F 12/224; B22F 12/53;
(Continued)

(56) References Cited

U.S. PATENT DOCUMENTS

| 9,688,028 B2 | 6/2017 | Mark et al. |
| 2015/0367375 A1 | 12/2015 | Page |

(Continued)

FOREIGN PATENT DOCUMENTS

| JP | 2018-526535 | 9/2018 |
| JP | 2019-116104 | 7/2019 |

(Continued)

OTHER PUBLICATIONS

Dusan N. Sormaz et al., "Automated Setup Planning using Integration of Geometric and Knowledge-based Algorithms with CAM Software", Flexible Automation and Intelligent Manufacturing, FAIM2008, Skövde, Sweden, Jun. 30-Jul. 2, 2008, pp. 163-170.
(Continued)

*Primary Examiner* — Charles R Kasenge
(74) *Attorney, Agent, or Firm* — Nixon & Vanderhye PC

(57) ABSTRACT

A method of determining a tool path for controlling a printing tool, including step (401) of receiving an input file containing data indicative of a three-dimensional structure to be formed. At step (404) the structure is divided into a plurality of build layers, which are separated in a build direction and each layer extends laterally relative to the build direction. Each layer includes an external contour defining the intersection of the layer with an exterior surface
(Continued)

of the three-dimensional structure. Step (405) defines a tool path, which fills the three-dimensional structure, wherein the path includes partially filling one or more higher build layers along the build direction before entirely filling at least one lower build layer. At step (406), a printing tool control algorithm is generated that includes a series of control commands for controlling the printing tool to move along the tool path to form the three-dimensional structure.

24 Claims, 21 Drawing Sheets

(51) Int. Cl.
  *B22F 10/38*   (2021.01)
  *B22F 12/00*   (2021.01)
  *B22F 12/53*   (2021.01)
  *B33Y 50/02*   (2015.01)
(52) U.S. Cl.
  CPC ............ *B22F 12/224* (2021.01); *B22F 12/53* (2021.01); *B33Y 50/02* (2014.12)
(58) Field of Classification Search
  CPC ........ B22F 10/366; B22F 10/80; B22F 12/90; B33Y 50/02; B33Y 10/00; B33Y 50/00; G05B 2219/49023; G05B 19/4099; G05B 19/19; G05B 19/402; G05B 2219/35134; G05B 2219/41475; G05B 2219/41477; G05B 2219/49011; G05B 2219/49246; G05B 2219/41447; Y02P 10/25; B29C 64/118; B29C 64/386; B29C 70/38; B29C 64/141; B29C 64/393; C23C 24/04; B25J 9/1664; B25J 9/1671; B25J 9/1682; B25J 9/1669; B28B 1/001
  See application file for complete search history.

(56) References Cited

U.S. PATENT DOCUMENTS

| | | | | |
|---|---|---|---|---|
| 2019/0161865 | A1* | 5/2019 | Chipko | B33Y 10/00 |
| 2019/0210287 | A1 | 7/2019 | Newell | |
| 2020/0055252 | A1* | 2/2020 | Lewicki | G06F 30/20 |
| 2020/0147876 | A1* | 5/2020 | Susnjara | G05B 19/4145 |

FOREIGN PATENT DOCUMENTS

| | | |
|---|---|---|
| WO | 2014/153535 | 9/2014 |
| WO | 2017/069832 | 4/2017 |
| WO | 2018/039260 | 3/2018 |
| WO | 2018/102754 | 6/2018 |
| WO | 2018/217903 | 11/2018 |

OTHER PUBLICATIONS

Jun. 21, 2023 Office Action issued in Chinese Patent Application No. 202080055859.6, pp. 1-6 (with English translation).
May 23, 2023 Search Report issued in European Patent Application No. 20846225.9, pp. 1-10.
Ding et al., "A tool-path generation strategy for wire and arc additive manufacturing," Mar. 24, 2014; pp. 173-183.
Mathias Hauan Arbo, et al., "A System Architecture for Constraint-Based Robotic Assembly with CAD Information", 2018 IEEE 14th International Conference on Automation Science and Engineering (CASE), Aug. 20-24, 2018, 7 pages.
Donghong Ding, et al., "A tool-path generation strategy for wire and arc additive manufacturing", International Journal of Advanced Manufacturing Technology, vol. 73, No. 1-4, 2014, 18 pages.
Jon Flores, et al., "Toolpath generation for the manufacture of metallic components by means of the laser metal deposition technique", The International Journal of Advanced Manufacturing Technology, vol. 101, Issue 5-8, 2019, pp. 2111-2120 (10 pages).
Ilker Kucukoglu, et al., "Application of precedence constrained travelling salesman problem model for tool path optimization in CNC milling machines", Special issue of the International Conference on Applied Mathematics in Engineering (ICAME'18), an International Journal of Optimization and Control: Theories & Applications, vol. 9, No. 3, available online May 28, 2019, pp. 59-68 (10 pages).
A. Kusiak, "Process Planning: a Knowledge-Based and Optimization Perspective", IFAC/CIRP/IFIP/IFORS Workshop on Decisional Structures m Automated Manufacturing, Genova, Italy, vol. 22, Issue 14, Sep. 1989, pp. 133-138 (6 pages).
Zhiyuan Wang, "Research on hybrid manufacturing using industrial robot", Doctoral Dissertation, Missouri University of Science and Technology, downloaded Sep. 15, 2020, 6 pages, https://scholarsmine.mst.edu/doctoral_dissertations/2548/.
Search Report for AU Application No. 2019902709 dated Dec. 23, 2019, 22 pages.
International Search Report for PCT/AU2020/050778 dated Sep. 18, 2020, 11 pages.
Written Opinion of the ISA for PCT/AU2020/050778 dated Sep. 18, 2020, 4 pages.
Sep. 10, 2024 Office Action issued in Japanese Patent Application No. 2022-506176, pp. 1-4 [machine translation included].

* cited by examiner

METHOD OF DETERMINING A TOOL PATH FOR CONTROLLING A PRINTING TOOL

This application is the U.S. national phase of International Application No. PCT/AU2020/050778 filed Jul. 30, 2020 which designated the U.S. and claims priority to AU Patent Application No. 2019902709 filed Jul. 30, 2019, the entire contents of each of which are hereby incorporated by reference.

TECHNICAL FIELD

The present invention relates to additive manufacturing and in particular to methods of determining a tool path for controlling a printing tool in an additive manufacturing process and subsequently controlling a printing tool in an additive manufacturing process based on that tool path.

While some embodiments will be described herein with particular reference to that application, it will be appreciated that the invention is not limited to such a field of use, and is applicable in broader contexts.

BACKGROUND OF INVENTION

In an additive manufacturing (also referred to as "3D printing") process, a printing mechanism (referred to as a "tool") is computer controlled to follow a predefined path (referred to as a "tool path") in 3D space to build a desired object from a printing material.

Typically, the path planning process for 3D printing involves a combination of (a) print head movements during which material is being added to the part as the print head moves, and (b) movements without deposition of material. The latter may be referred to as skip or jump movements. In a polymer 3D printing process, for example, the extruder motor is turned off during a jump movement.

In some additive manufacturing processes, it is difficult or impossible to turn the material feed on and off quickly as doing so disturbs the material deposition process in some way. In these processes, a more suitable tool path strategy is one in which the feed is kept on for as much of the build as is possible.

3D printing conventionally involves a layer-by-layer build process, in which all tool paths for a layer n are completed before progressing to the next layer n+1. In this regard, existing 3D printing software for producing G-code for 3D printing achieves computational efficiency by reducing a 3D problem to a 2D one. It does this by first slicing the object, i.e. finding the intersection of regularly-spaced planes with the triangles in an .STL file, defining the 2D area to be filled in each layer and then performing tool path planning on this 2D area, one layer at a time.

However, this layer-by-layer approach is inefficient for any three axis additive manufacturing system and especially in more advanced systems involving one or two 6-axis robot arms, which offer the possibility of performing more sophisticated three dimensional manufacturing. In systems of two robot arms (one holding the part and the other the deposition head) up to 12 degrees of freedom are possible as rotational movements can also be performed. A rigid, layer-by-layer path planning approach does not take advantage of this freedom.

Some more advanced tool paths have been devised such as Fractal space filling curves such as Peano curves and Hilbert curves. However, these paths inherently involve a high number of turns for a given length of path. The number of turns can be too high for large scale robotic application, where manoeuvring a heavy part or deposition head at high speed entails considerable deceleration/acceleration. Robots suffer excessive vibration and wear if large numbers of directional changes are included in the tool path, and high-speed movement is not possible if the robot arm does not have sufficient path length over which to accelerate and reach constant velocity.

To partially address some of the above deficiencies, Michel et al. "A modular path planning solution for Wire+Arc Additive Manufacturing", *Robotics and Computer-Integrated Manufacturing* Volume 60, December 2019, Pages 1-11) used partitioning (segmentation) of individual object layers with different path planning strategies within each segment. They term this 'Modular Path Planning (MPP)'. In the MPP process, once a path has been generated for all segments, they are combined into a single layer path. However, the deposition is not continuous along the entire layer. Instead, when reaching the end of a section, the deposition is stopped and the torch moves to the starting point of the following section with the arc off and without feeding any material. Thus, this technique still involves multiple deactivations of the tool.

Dwivedi, Rajeev & Kovacevic, Radovan (2004) "Automated torch path planning using polygon subdivision for solid freeform fabrication based on welding", *Journal of Manufacturing Systems,* 23(4), p 278-291, used continuous path planning with monotone polygon subdivision for the welding additive manufacturing process. However, this technique is silent on extending a continuous path to other layers in a 3D structure. Thus, the technique likely follows a layer-by-layer approach.

Flores, J. et al, "Toolpath generation for the manufacture of metallic components by means of the laser metal deposition technique", *The International Journal of Advanced Manufacturing Technology,* 2019, Vol. 101, Issue 5-8, pp 2111-2120 teaches an optimised hybrid tool path strategy that combines contour curves and zigzag filling patterns to provide a uniform growth with constant overlap for each build layer. Flores et al. also teaches a multi-axis strategy for tilting the printing head to more accurately form overhang features. This results in curved layer deposition.

However, in each of the techniques discussed above, tool path deposition is planned on a layer-by-layer approach wherein a layer (whether planar or curved) must be completely deposited before the next layer is commenced.

SUMMARY OF INVENTION

One aspect of the present invention provides a method of determining a tool path for controlling a printing tool, the method including the steps:

a) receiving an input file containing data indicative of a three dimensional structure to be formed;

b) dividing the three dimensional structure into a plurality of build layers, wherein build layers are separated in a build direction and each build layer extends laterally relative to the build direction, each build layer including an external contour defining the intersection of the build layer with an exterior surface of the three dimensional structure;

c) defining a tool path which fills the three dimensional structure, wherein the tool path includes partially filling one or more higher build layers along the build direction before entirely filling at least one lower build layer; and d) generating a printing tool control algorithm including a series of control commands for controlling the printing tool to move along the tool path to form the three dimensional structure. In some embodiments, step c) includes:

c)i) partitioning each build layer into one or more layer regions;

c)ii) determining, based on a first predefined infill strategy, a first tool path section that entirely fills a first layer region;

c)iii) determining, based on a second predefined infill strategy, a second tool path section that entirely fills a second layer region that is adjacent the first layer region in either the same layer or an adjacent layer, wherein an end point of the first tool path section within the first layer region is immediately adjacent a corresponding starting point of the second tool path section;

c)iv) repeating steps cii) and ciii) for all layer regions by matching tool path section start points with a corresponding tool path section end point of a previous tool path section of an adjacent layer or layer region to define a single tool path.

In some embodiments, step c)iv) includes defining contour loop paths which extend around an external contour of the structure between adjacent partition start and end points.

In other embodiments, step c) includes:

c)i) partitioning each build layer into a plurality of layer regions based on a feature of the structure or build process;

c)ii) for each layer region, determining a plurality of possible infilling path options, including start and end points within the layer region;

c)iii) determining a precedence graph for each feature based on features which lie partially or wholly above/below other features in the structure; and c)iv) determining an order of execution in the tool path that obeys precedence relations determined in the precedence graph such that each feature is executed only once, wherein an end point of a current feature in the sequence is adjacent to a start point of a next feature.

In some embodiments, the features include sub-areas of the structure that need to be infilled before other regions. In some embodiments, the features include connecting paths between infill sections. In some embodiments, the features include loop paths that loop around structural features. In some embodiments, the infilling path options include an infill strategy.

In some embodiments, the printing tool is controlled to perform an additive manufacturing process to form the three dimensional structure. In some embodiments, the three dimensional structure forms part of a larger three dimensional object.

In some embodiments, the tool path is continuous such that a flow of printing material to the printing tool is maintained throughout a printing process.

In some embodiments, the method includes the step of a)i) receiving, from a user through a user interface, one or more build parameters for building the three dimensional structure. In some embodiments, the build parameters include an infill strategy. In some embodiments, the infill strategy includes a double layer strategy wherein a tool path section in layer n+1 is the direct reverse of a tool path section in an adjacent layer region of adjacent layer n. In some embodiments, the infill strategy includes a spiral infill pattern starting at an outer layer region point and finishing at a central layer region point. In these embodiments, the infill strategy of an adjacent layer includes a reverse spiral pattern which starts at the central point and finishes at the outer point. In some embodiments, the infill strategy includes a raster pattern infill strategy. The first and second infill strategies may be the same or different.

In some embodiments, dividing the three dimensional structure into a plurality of sub-regions includes partitioning the three dimensional structure into one or more volume structures prior to defining the build layers. The build layers may include planar surfaces, curved surfaces or other shapes.

A second aspect of the present invention provides a method of determining a tool path for controlling a printing tool, the method including the steps:

a) receiving an input file containing data indicative of a three dimensional structure to be formed;

b) dividing the three dimensional structure into a plurality of sub-regions, the sub-regions including a plurality of build layers, wherein each build layer includes an external contour defining the intersection of the build layer with the exterior surface of the three dimensional structure;

c) partitioning each build layer into one or more layer regions;

d) determining, based on a first predefined infill strategy, a first tool path section that entirely fills a first layer region;

e) determining, based on a second predefined infill strategy, a second tool path section that entirely fills a second layer region that is adjacent the first layer region in either the same layer or an adjacent layer, wherein an end point of the first tool path section within the first layer region is immediately adjacent a corresponding starting point of the second tool path section;

f) repeating steps d) and e) for all layer regions by matching tool path section start points with a corresponding tool path section end point of a previous tool path section of an adjacent layer or layer region to define a single tool path; and g) generating a printing tool control algorithm including a series of control commands for controlling the printing tool to move along the tool path to form the three dimensional structure.

In some embodiments, step f) includes defining contour loop paths which extend around an external contour of the structure between adjacent partition start and end points.

In some embodiments of the first and second aspects, the tool path is defined so as to optimize a printing time for forming the three dimensional structure. In some embodiments, the tool path is defined so as to minimize a number of printing tool jumps along the tool path during the forming of the three dimensional structure. In some embodiments, the tool path is defined so as to minimize a number of path intersections along the tool path. In some embodiments, the tool path is continuous and non-intersecting with other sections of the path. In some embodiments, the tool path is defined so as to minimize an amount of printing material used for forming the three dimensional structure. In some embodiments, the tool path is defined so as to optimize a number and degree of printing tool turns along the tool path. In some embodiments, the tool path is defined so as to optimize a number of layer crossings to enhance a strength of the overall build of the three dimensional structure.

Preferably, the steps of the methods described above are performed sequentially in the order they are described.

A third aspect of the present invention provides a method of controlling a printing tool in an additive manufacturing process, the method including:

executing, by a computer processor, a printing tool control algorithm generated by the method according to any one of the preceding claims; and generating, in response to the printing tool control algorithm, electrical signals to control a printing tool to move along a tool path to form a predefined three dimensional structure.

In some embodiments, the printing tool control algorithm includes instructions to vary one or more build parameters across different build layers or layer regions. In some embodiments, a line spacing of the printing tool varies between one or more layer regions. In some embodiments, a motion of the printing tool varies between one or more layer regions. In some embodiments an infill strategy varies between one or more layer regions. In some embodiments, a thickness or height of a build layer varies between one or more layers.

In some embodiments, the printing tool includes at least one robotic arm. In some embodiments, the printing tool includes a cold spray gun that is held in an operative position by the robotic arm.

A fourth aspect of the present invention provides a computer system configured to implement a method according to any one of the first, second or third aspects.

A fifth aspect of the present invention provides a computer program comprising instructions which, when executed by a computer, cause the computer to carry out the method according to any one of the first, second or third aspects.

A sixth aspect of the present invention provides a computer-readable storage medium comprising instructions which, when executed by a computer, cause the computer to carry out the method according to any one of the first, second or third aspects.

A seventh aspect of the present invention provides an additive manufacturing system including:

a computer processor configured to execute a printing tool control algorithm generated by a method according to any one of the first to third aspects; and a printing tool responsive to electrical signals generated by the computer processor based on the printing tool control algorithm, the electrical signals configured to move the printing tool along a tool path to form a predefined three dimensional structure.

BRIEF DESCRIPTION OF DRAWINGS

Preferred embodiments of the disclosure will now be described, by way of example only, with reference to the accompanying drawings. It will be appreciated that the embodiments shown are examples only and are not to be taken as limiting the scope of the invention as defined in the claims appended hereto.

FIG. 5b is a perspective view of an STL triangulation of the 3D CAD file of FIG. 5a;

FIG. 7b is an elevated view of an exemplary layer from the cross-shaped structure of FIG. 7a;

DETAILED DESCRIPTION

System Overview

The embodiments disclosed and illustrated herein will be described with reference to cold spray deposition type 3D printing in which solid powders are projected onto a substrate under pressure to adhere with the substrate. However, it will be appreciated that the disclosure is also applicable to other types of 3D printing such as welding-based additive manufacturing (e.g. wire arc additive manufacturing), viscous fluid 3D printing, 3D printing of polymers and fibre-reinforced polymers and concrete 3D printing.

Figure 1:
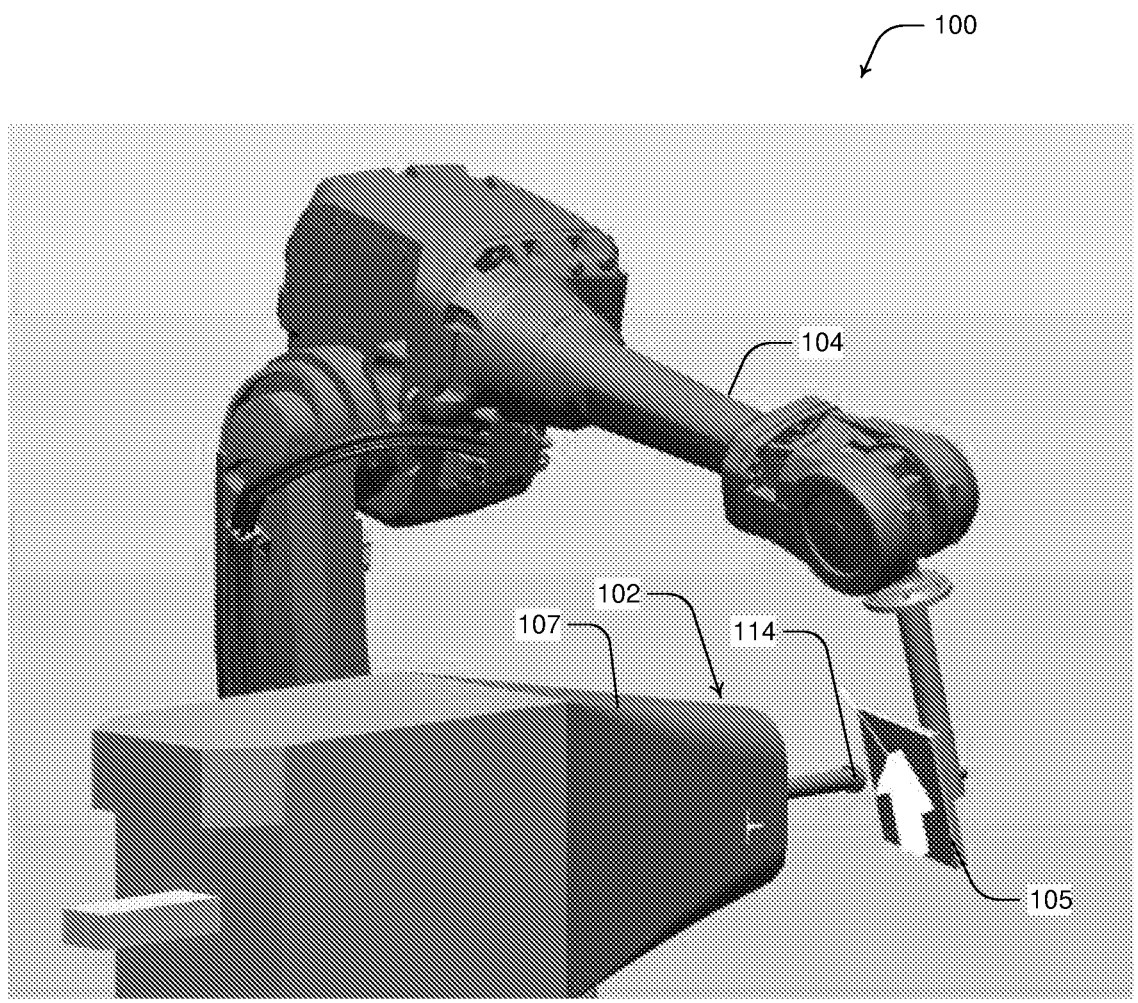
FIG. 1 is a side perspective view of a first cold spray additive manufacturing system including a robotic arm holding a substrate and a stationary cold spray gun.
Figure 2:
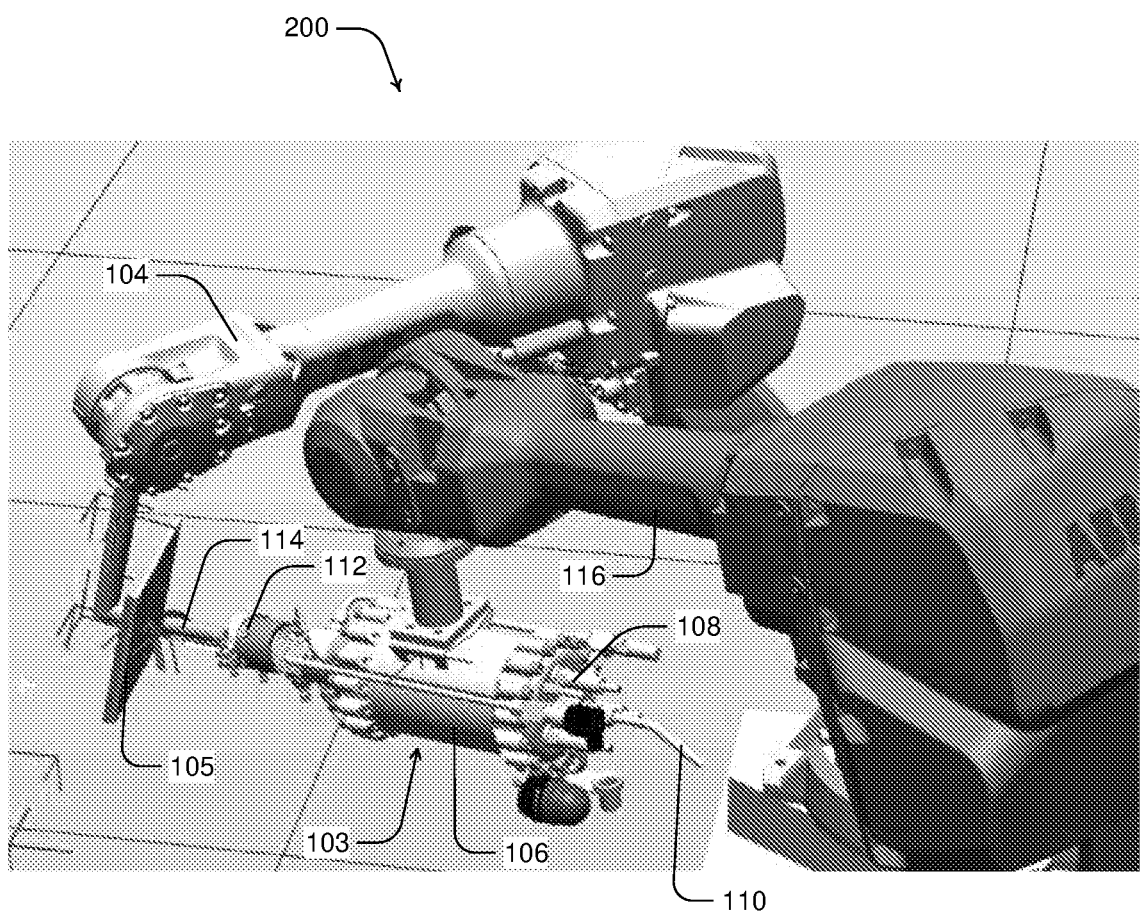
FIG. 2 is top down perspective view of a second cold spray additive manufacturing system including a pair of robotic arms holding a cold spray gun and substrate respectively.

Referring initially to FIGS. 1 and 2, there is illustrated two similar but alternative cold spray additive manufacturing systems 100 and 200. System 100 of FIG. 1 includes a printing head in the form of a stationary cold spray gun 102 and a six axis robotic arm 104 for holding a substantially planar printing substrate 105. Cold spray gun 102 is a model manufactured by Plasma Giken Co. Ltd. and includes a main body 107 and an elongate cylindrical printing head 114. The spray gun printing head 114 is adapted to project a beam of deposition powder under high pressure onto a desired region of substrate 105. During impact with the substrate, particles undergo plastic deformation and adhere to the surface of substrate 105. Typical material powders include metals and their alloys, polymers, ceramics, composite materials and nanocrystalline powders and the typical particle size is around 1 to 50 microns.

FIG. 2 illustrates a similar system to that of FIG. 1 but with the cold spray gun 103 mounted to a second six axis robotic arm 116. Corresponding features of FIG. 1 are designated with like reference numerals in FIG. 2. Cold spray gun 103 is a model manufactured by Impact Innovations GmbH and includes a substantially cylindrically elongate body 106 extending between a back end 108 in which a material supply conduit 110 extends, and a front end 112 in which spray gun printing head 114 projects.

It will be appreciated that spray gun 103 and robotic arms 104 and 116 may be replaced by other equivalent devices for performing cold spray deposition or other additive manufacturing processes. In other embodiments, the dual robotic arm system may be replaced by other combinations of fixed or robotic controlled mounts. For example:

- In one embodiment, the cold spray gun (or other print head) is held by a robotic arm and the substrate is maintained stationary in a fixed mount.
- In one embodiment, the spray gun (or other print head) is held by a six axis robotic arm and the substrate is mounted on a positioner device which consists of a rotary table (turntable) and a tilt mechanism. This system provides two additional axes to the robot arm.
- In other embodiments, an additive manufacturing cell is provided which uses motors to move the printing head and/or a substrate stage along tracks or rails. For example, a Cartesian 3D printer uses three sets of motors (e.g. stepper motors) to perform X-Y-Z translational movements. Similar systems are available which use delta and polar configurations.

In other embodiments, the cold spray system 100 can be replaced by other additive manufacturing systems and the cold spray gun 102 replaced with other printing heads. For example, in a wire arc additive manufacturing (WAAM) system, the printing head includes a welding torch. In a directed energy deposition (DED) system, the printing head incorporates a laser, electron beam or plasma arc to deposit material by melting. In other systems, the printing head may include an extrusion nozzle.

The 3D position and 3D orientation of printing head 114 is tightly electromechanically controlled by a six axis robotic arm 116 mounted to a top portion of spray gun body 106. Similarly, the 3D position and 3D orientation of substrate 105 is also able to be tightly electromechanically controlled by robotic arm 104 to enable full printing control over twelve degrees of freedom.

Figure 3A:
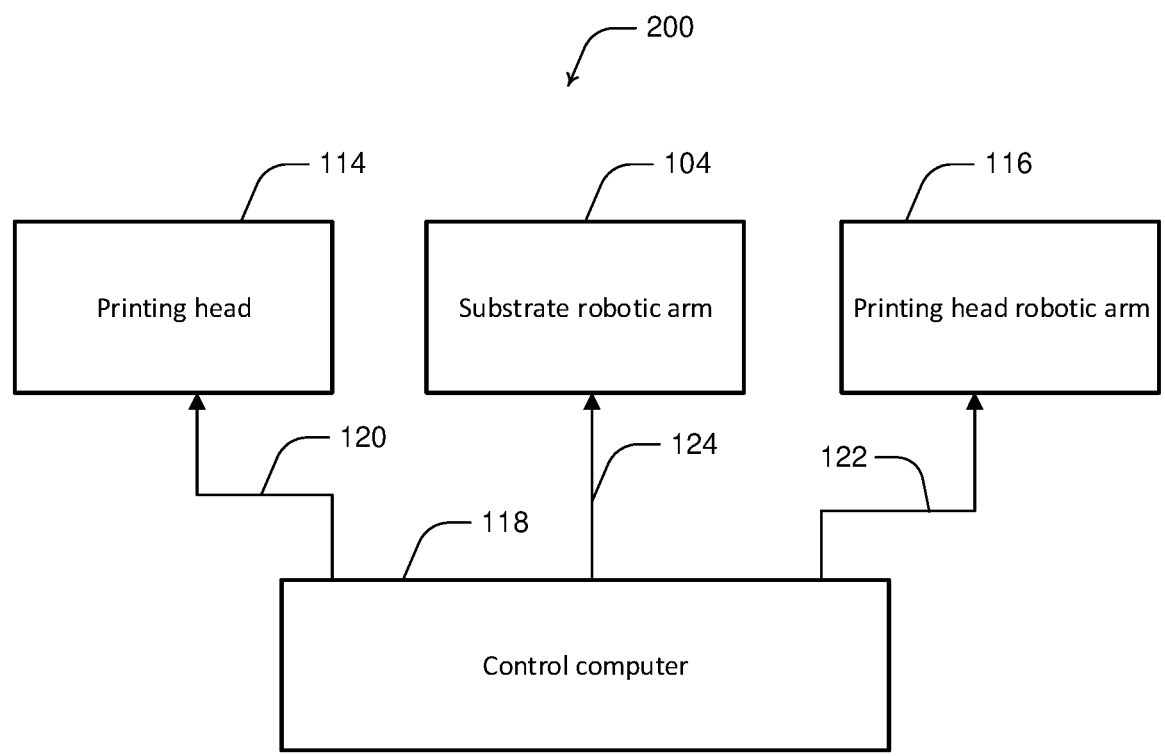
FIG. 3a is a schematic system level diagram of the cold spray additive manufacturing system of FIGS. 1 and 2.

Referring now to FIG. 3a, robotic arms 104 and 116 are controlled by a control computer 118, which is in electrical or wireless data connection with each robotic arm. By way of example, robotic arms 104 and 11 and control computer 118 may be an industrial robot manufactured by ABB Robotics. Control computer 118 is configured to transmit position control signals 120 to robotic arm 104 to position and orient substrate 105 at any 3D position/orientation in an operational space. Similarly, control computer 118 is configured to transmit position control signals 122 to robotic arm 116 to position and orient printing head 114 at any 3D position/orientation in the operational space. Further, control computer 118 is also configured to send a deposition material flow control signal 124 to spray gun 102 to selectively activate, deactivate or vary flow parameters of the material flow from printing head 114. In some embodiments, additional feedback control signals are also sent from robotic arms 104 and 116 and spray gun 102 to control computer 118.

Figure 3B:
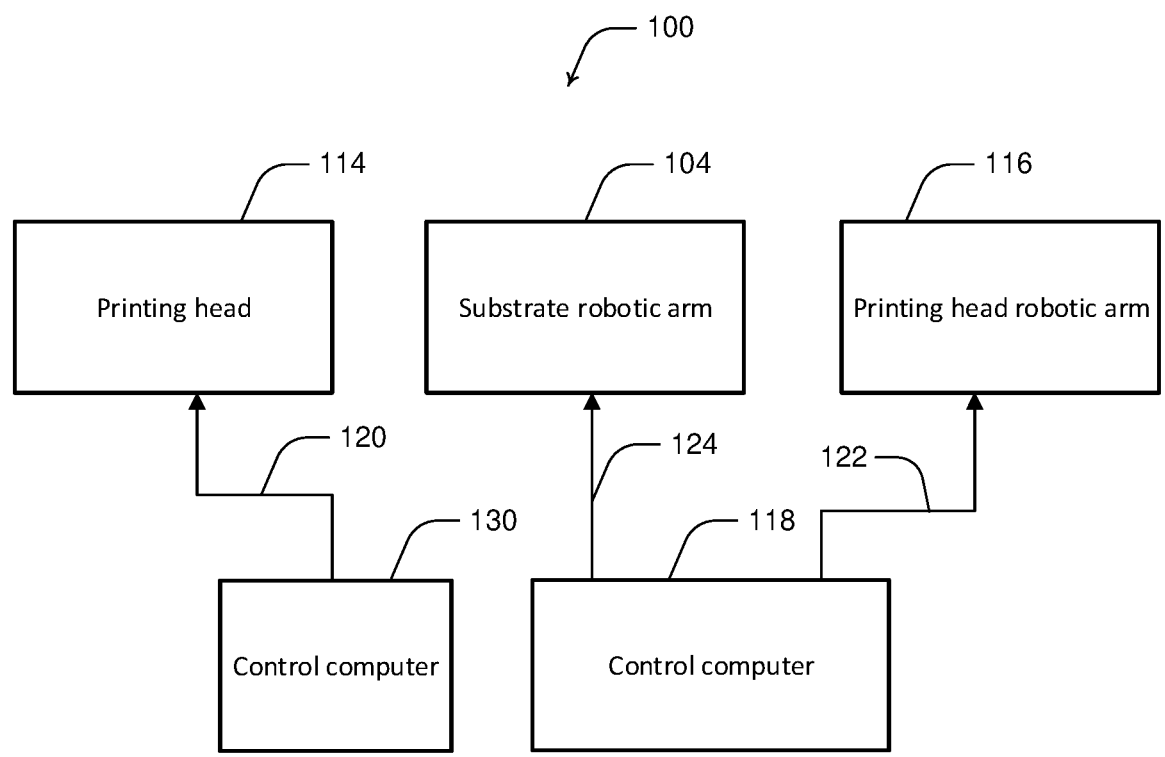
FIG. 3b is a schematic system level diagram of the cold spray additive manufacturing system of FIGS. 1 and 2 in which two separate control computers are utilised.

As illustrated in FIG. 3b, in an alternative arrangement, a separate control computer 130 may be used to control spray gun 102 for the cold spray process to computer 118 used to control the robotic arms 104 and 116. In this arrangement, the cold spray process is entirely independent from the robot controller. This has the advantage of facilitating the deposition process in a more constant way, without needing to adjust feed rate, power, etc. to keep it at optimal conditions.

Throughout this specification, use of the term "printing tool" for performing an additive manufacturing process is intended to refer to one or more of the spray gun 102, printing head 114 and robotic arms 104 an 116. In this regard, a "tool path" may refer to a relative physical position between a tip or tool centre point (TCP) of printing head 114 and substrate 105. In cold spray robot programming, the TCP is typically a short distance from the tip of the nozzle. For example, the substrate could be maintained at a set standoff distance such as 20 mm or 30 mm from the end of the nozzle. If the printing head is being angled relative to the substrate, the centre of rotation is the TCP. The geometry of a tool path is typically defined relative to substrate 105. By way of example, a 3D tool path coordinate system may be defined relative to a corner of substrate 105.

Control signals 120, 122 and 124 comprise a series of encoded control commands for controlling the printing tool to move along the tool path to form a three dimensional structure or object to be manufactured. These control commands for position control signals 120 and 122 are determined by a tool path planning process outlined below with reference to FIG. 4.

Tool Path Planning

Figure 4A:
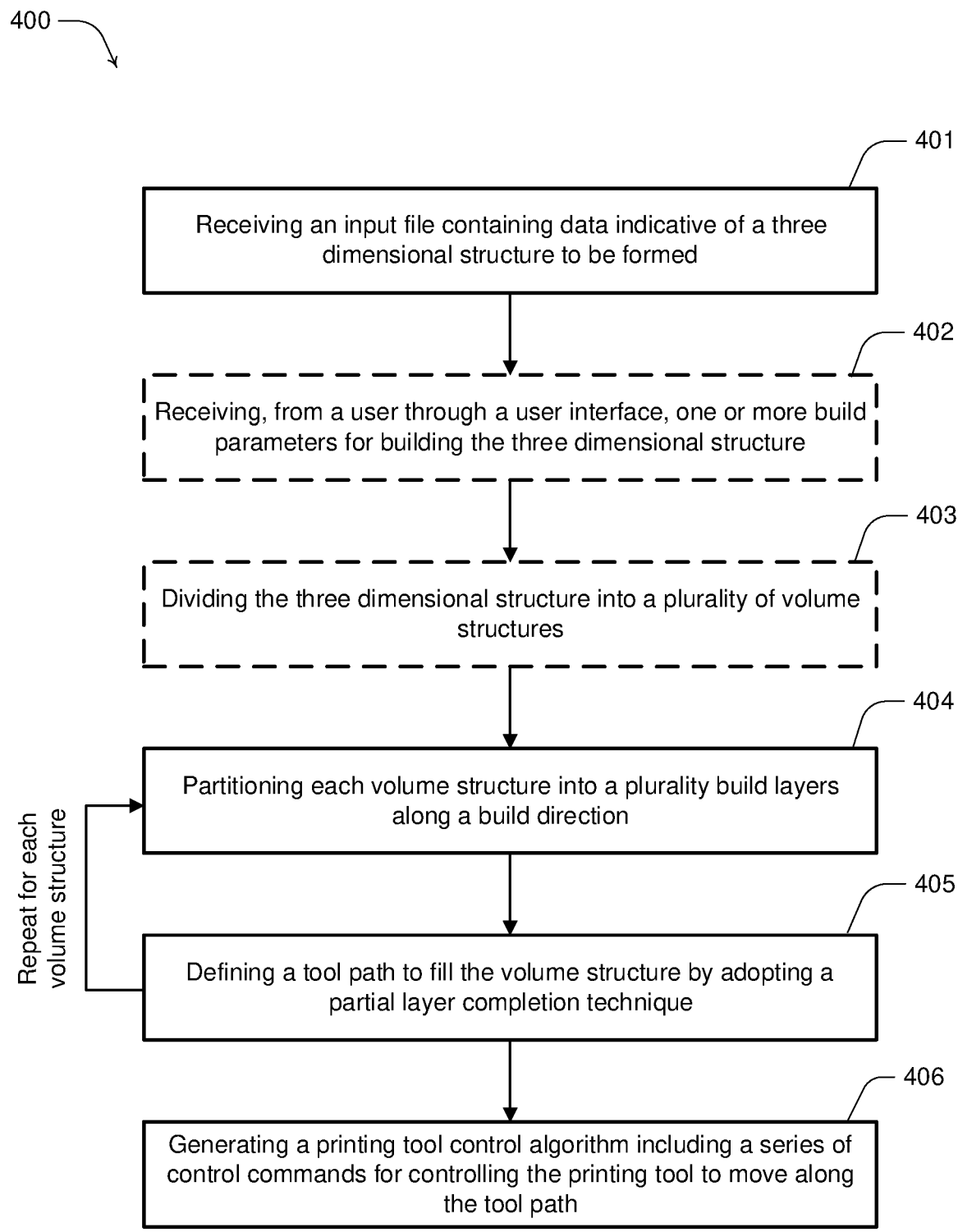
FIG. 4a is a process flow diagram illustrating the primary steps in a method of determining a tool path for controlling a printing tool such as that illustrated in FIG. 1.

Referring to FIG. 4a, there is illustrated a method 400 of determining a tool path for controlling a printing tool such as that illustrated in FIGS. 1 and 2. At initial step 401, method 400 includes receiving an input file containing data indicative of a three dimensional structure to be formed.

Figure 5A:
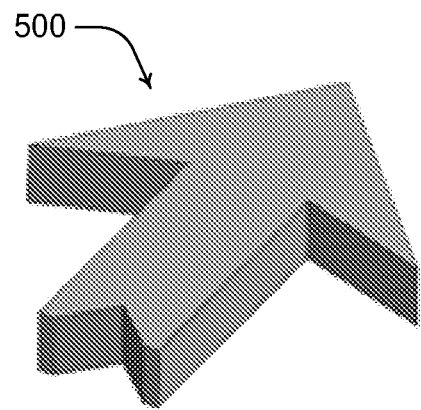
FIG. 5a is a perspective view of an arrow shaped object to be formed as represented by a 3D CAD file.
Figure 5B:
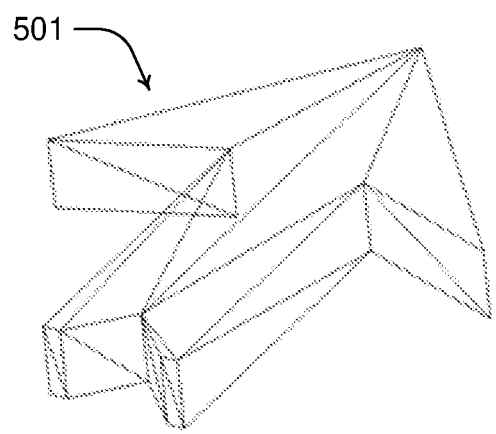

The input file is typically an .STL (stereolithography) file created from a three dimensional model of the structure or object to be fabricated using a computer-aided design (CAD) software package. However, the input file may take other forms such as .OBJ, .AMF and .3MF file formats. By way of example, FIG. 5a illustrates an exemplary arrow shaped object 500 to be formed as represented by a 3D CAD file. FIG. 5b illustrates a corresponding STL triangulation 501 of the 3D CAD file. STL files are a standard file format for input into various slicing software products available for 3D printing applications. STL files describe only a surface geometry of a three-dimensional structure without any representation of other common CAD model attributes such as colour and texture. In some embodiments, the STL file represents the object as a mesh of interconnected triangles, each having corresponding coordinates based on a predefined geometric coordinate system.

It will be appreciated that any of a variety of commercially-available CAD software packages may be used to produce the input file including, but not limited to, Solid-Works (Owned by Dassault Systèmes SolidWorks Corporation), Autodesk Fusion 360 (Owned by Autodesk, Inc.), Autodesk Inventor (Owned by Autodesk, Inc.) and the like.

At optional step 402, one or more build parameters for building the three dimensional structure may be entered by a user through a user interface. The user interface may be a graphical user interface (GUI) accessible through a display and user input device in data communication with control computer 118. Alternatively, the user interface may be accessible by a separate computer device that is in data communication with control computer 118 via a network such as a LAN or the internet. Step 402 is optional in that the build parameters may be predefined and set automatically as opposed to manually entered. In either case, certain build parameters must be defined prior to commencement of the tool path determination process.

Example build parameters include:
An infill strategy such as a raster, spiral, zigzag or hybrid pattern infill strategy.
A layer height or thickness of build layers.
A line spacing of the tool path.
A traverse speed of the printing head.
A nozzle angle of the printing head.
A minimum or maximum radius of curvature of turns in the tool path.
A printing head starting point.
A tolerance or deviation permitted from actual tool path specifications.

Figure 6:
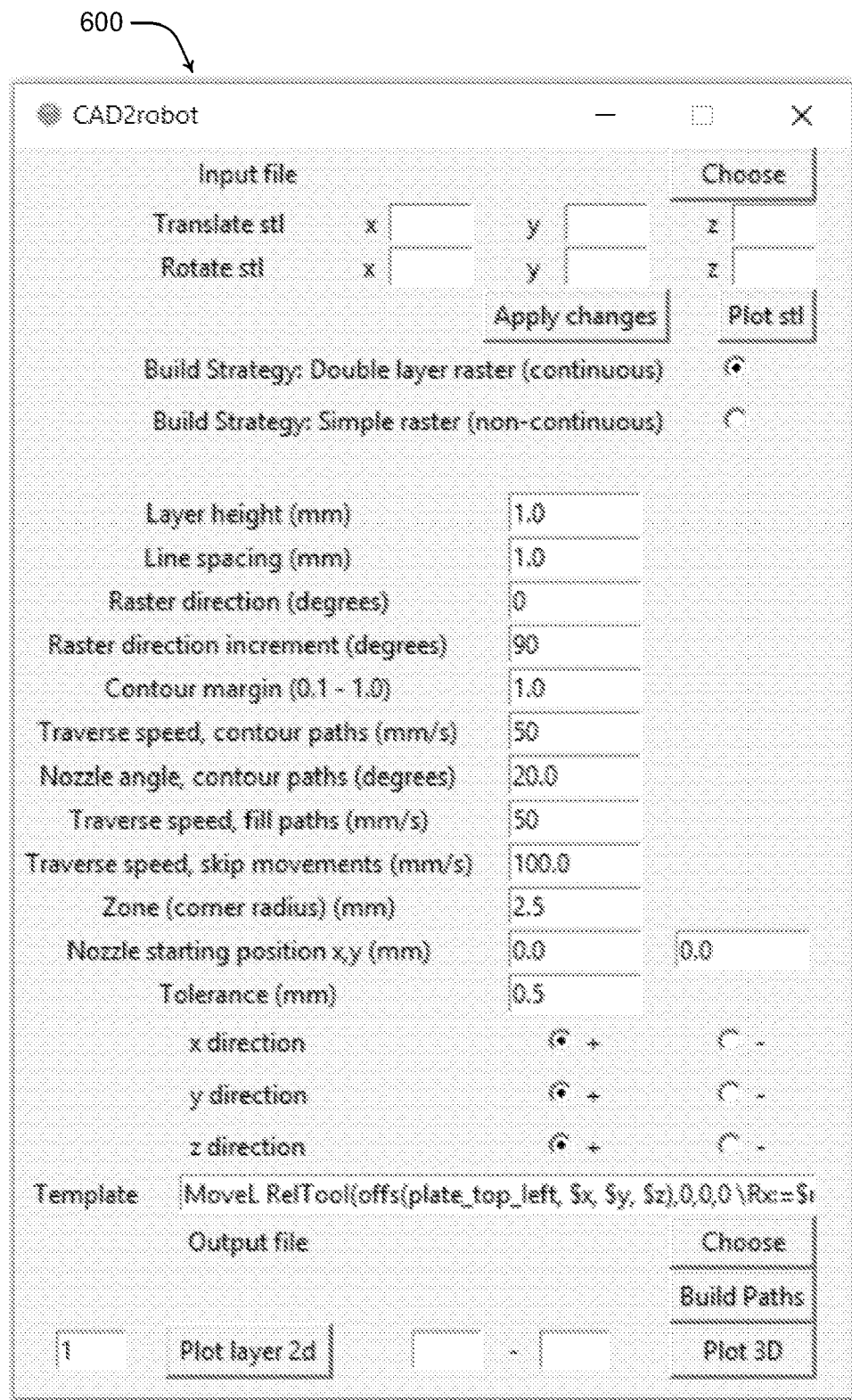
FIG. 6 is a screenshot of an exemplary GUI used to slice STL files, calculate tool paths and output a printing tool control algorithm.

FIG. 6 illustrates a screenshot of an exemplary GUI 600 used to slice STL files, calculate tool paths and output a printing tool control algorithm. The software behind this GUI was written in the Python programming language. However, it will be appreciated that similar programs may be implemented in other programming languages.

At optional step 403, the three dimensional structure may be divided into a plurality of volume structures. This volume partitioning may occur when the three dimensional structure is more complex and includes a number of different shaped components. Examples of a complex structure which might be divided into different volume sub-regions include structures with overhang such as brackets or wing ribs. Or take for example a table. In this case, the base of the table may be partitioned separately to each leg and the different volume structures manufactured separately. Therefore, the three dimensional structure to be manufactured by a tool path determined by method 400 may form part of a larger three dimensional object in which the different volume structures have different build directions. For simple structures, the build process may be performed without dividing the three dimensional structure into volume structures.

Figure 7A:
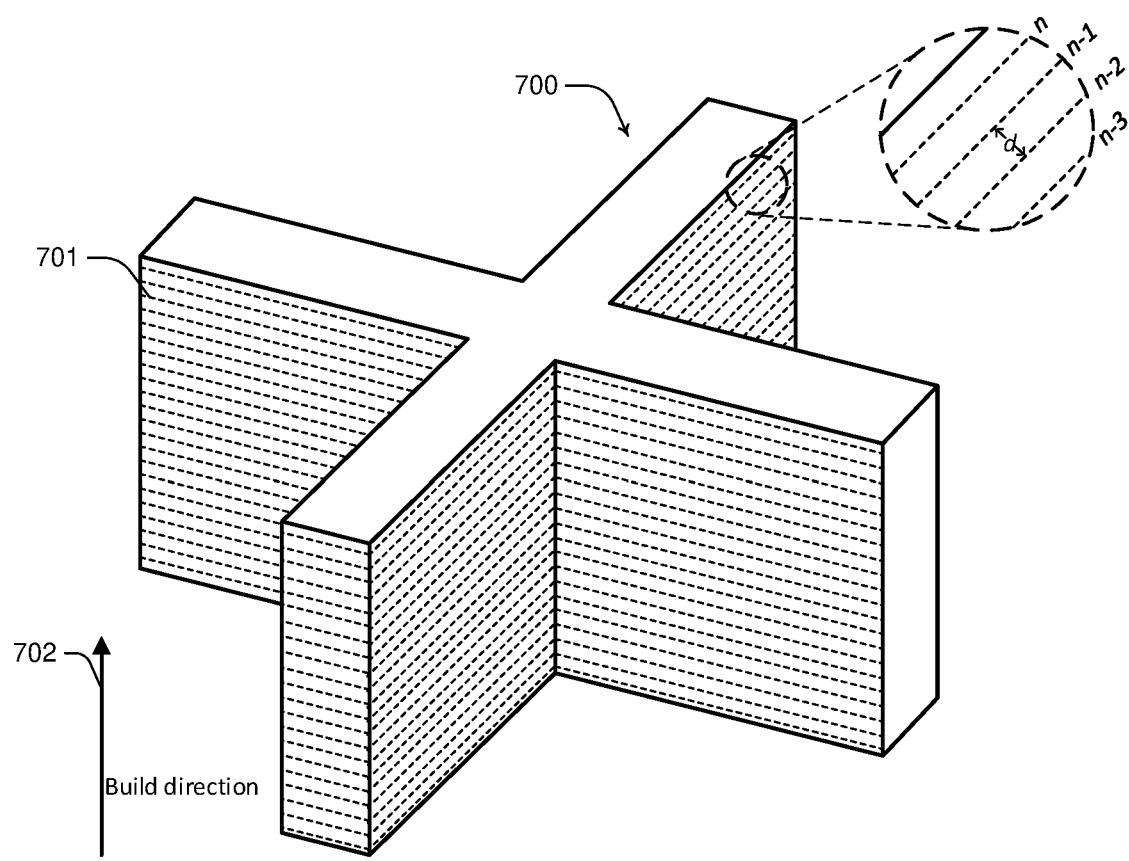
FIG. 7a is an elevated perspective view of a 3D cross-shaped structure that has been divided into a plurality of horizontal planes.
Figure 7B:
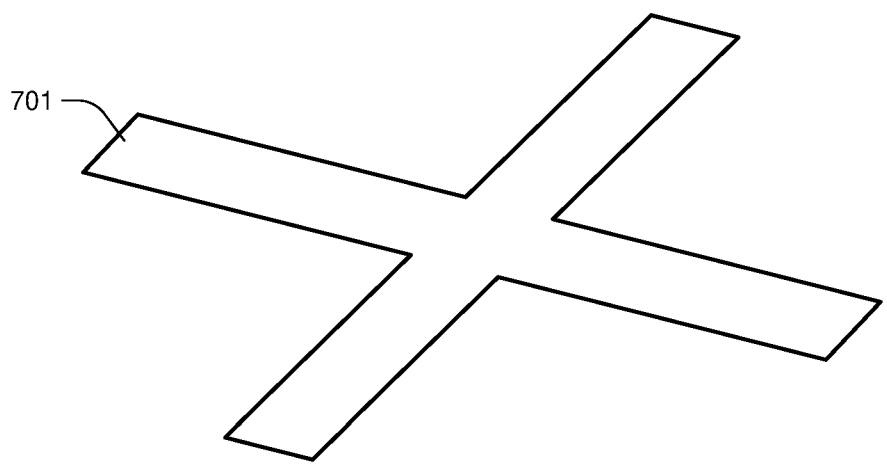

At step 404, for each of the volume structures, a build direction is defined through the structure and a plurality of build layers are defined that extend laterally relative to a build direction. By way of example, FIG. 7a illustrates a 3D cross-shaped structure 700 that has been divided into a plurality of horizontal planes (e.g. 701) indicated by dashed lines. The build direction is illustrated by the arrow 702. Layer 701 resulting from the slicing is illustrated in FIG. 7b.

As an additive manufacturing process involves the sequential deposition of material onto substrate 105, there is necessarily a predefined build direction which is typically perpendicular to a surface of substrate 105. As mentioned below, in some embodiments, there may be more than one build direction for different volume structures of an object, particularly where more complex support elements are required for the structure. However, within a particular volume structure of an object, additive manufacturing processes conventionally rely on deposition in a sequence of build layers.

Each build layer extends across the three dimensional structure and therefore includes one or more contours which are loops defining the intersection of the build layer with the surfaces of the object to be formed. In general practice, 3D models such as STL format files approximate the model surface with a triangular mesh. As a result, the intersection of the layer plane with the model surfaces produces contours comprising straight line segments. They are simple, non-intersecting polygons.

External contours result from intersection of the layer plane with the exterior surfaces of the 3D object, such as the vertical walls of cross-shaped structure 700. Each defined layer must contain at least one external contour. An internal contour is always restricted to the region bounded by an external contour and results from slicing a 3D object which contains internal cavities. Not all layers will contain internal contours and if the 3D object does not contain internal cavities, there will be no internal contours in the sliced model.

Build layers extend generally perpendicularly with respect to a defined build direction but, in the case of curved layers, may also extend partially in the direction of the build layer. However, more generally, build layers extend laterally with respect to a build direction. Conventional additive manufacturing processes rely on completely filling a layer before the process moves to the next layer. That is, completely filling a build layer between an external contour and internal contour (if there is one).

As illustrated in the inset of FIG. 7a, the layering process of step 404 involves slicing the three dimensional structure in the STL file (or other input file format) into n unidirectional or multidirectional layers separated by a thickness d based on a slicing algorithm. The chosen thickness d of each layer in setting the build parameters will ultimately determine the positions of robotic arms 104 and 116 during each layer. However, a thicker layer will require more printing material to be projected from printing head 114 for each layer. Therefore, a layer thickness build parameter will, in part, define the position control signals 120 and 122, as well as the material flow control signal 124.

As mentioned above, an STL file includes a set of triangles in three dimensional space. Each triangle comprises three line segments. In one embodiment, the layering process of step 404 includes determining the intersection points of the set of STL line segments with the infinite plane defining the layer. The intersection points are then arranged and grouped to make the contour polygons.

As mentioned above, typically the build layers include planar surfaces that extend laterally and perpendicularly with respect to the build direction. However, in some embodiments, the build layers may include curved surfaces or other non-planar structures. For example, cylindrical slicing takes advantage of a robot arm's axis to perform rotational movements.

Where a larger three dimensional structure is partitioned into separate volume structures at step 403, this layer partitioning process of step 404 may be performed separately for each volume structure and each volume structure may include a different build direction. Thus, by way of example, a three dimensional structure may comprise three volume structures $V_i$, $V_j$, $V_k$ with each volume structure divided respectively into stacks of $n_i$, $n_j$ and $n_k$ layer slices having respective thicknesses $d_i$, d and $d_k$. The number of layer slices and thicknesses of the different volume structures may be the same or different.

At step 405, a tool path is defined to fill the volume structure (or entire three dimensional structure if only a single volume structure is defined at step 403) by adopting a partial layer completion technique specific to the present invention. In this partial layer completion technique, a tool path is defined which fills the volume structure by partially filling one or more higher build layers along the build direction before entirely filling at least one lower build layer. In this manner, the tool path is not constrained to a layer by layer approach as with prior art techniques and leverages the degrees of freedom available from traversing the entire three dimensional volume structure.

A few different approaches are possible for performing the partial layer completion technique in step 405. One such approach involves leveraging optimisation algorithms to define suitable paths with partial layer crossings. In one approach, separate sections of tool path are defined within the volume structure and these are linked together using an optimisation algorithm based on graph theory. For example, a Hamiltonian path finding algorithm could be applied to link together sections of the tool path that are adjacent while utilising each section of the tool path only once.

In three dimensions, a tool path section in layer n may be adjacent to a neighbouring region also in layer n or to a region in layer n+1 or n−1. This technique may be particularly useful in attempting to fill complex shapes, where multiple transitions across different layers are required in order to link sections. Alternatively, the distance between nearby sections of tool path could be recorded as a cost matrix. Then a cost-minimisation routine may be implemented to find the minimum path between nearby sections. A precedence graph may be created to keep track of areas of the layers below that need to be filled first, before a particular region in the current layer can be filled to avoid 'undercutting'.

Double Layer Tool Path Strategy

Figure 4B:
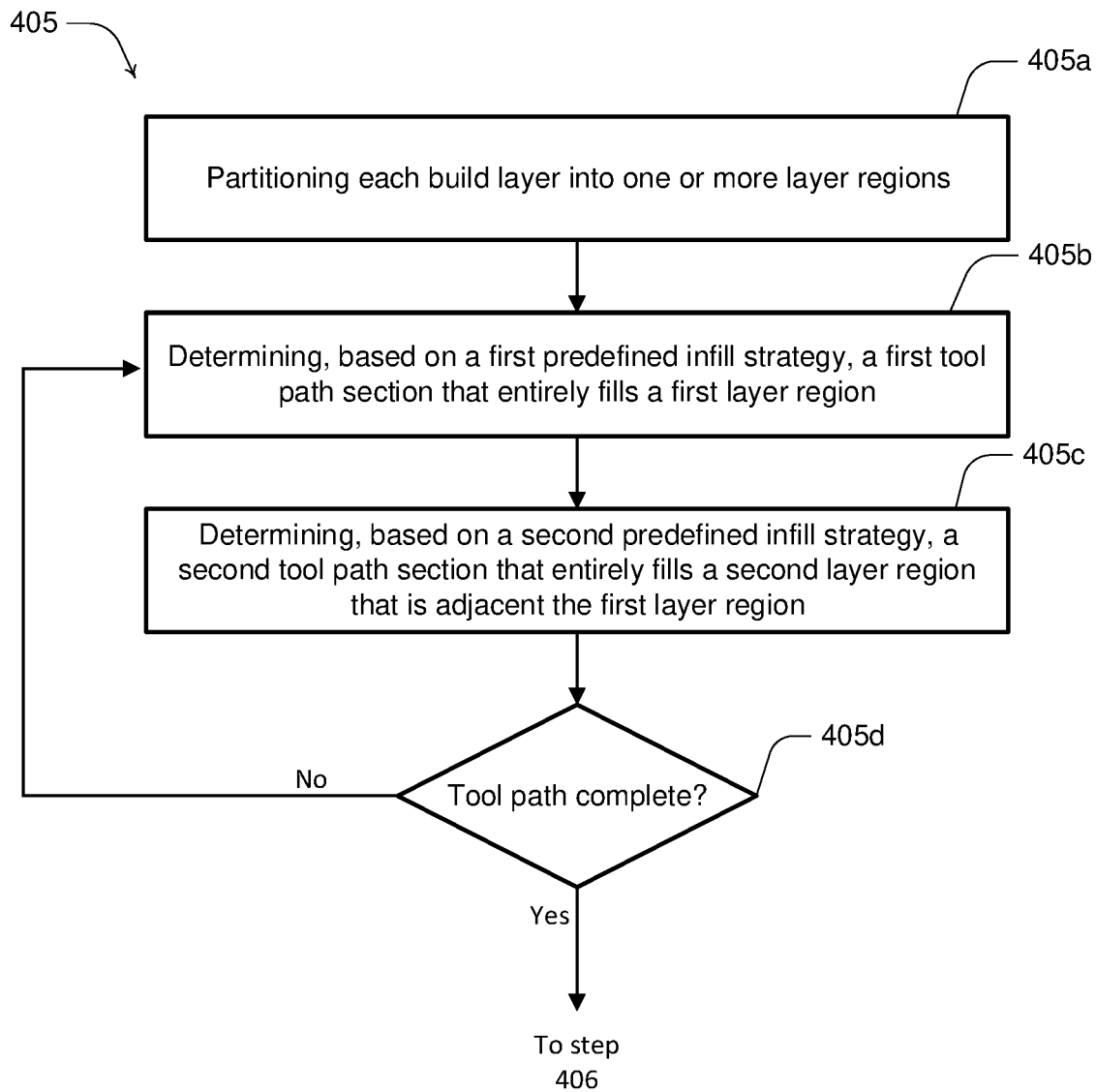
FIG. 4b is a process flow diagram illustrating the primary steps in a first method of performing a partial layer approach to define a tool path in the method of FIG. 4.
Figure 8:
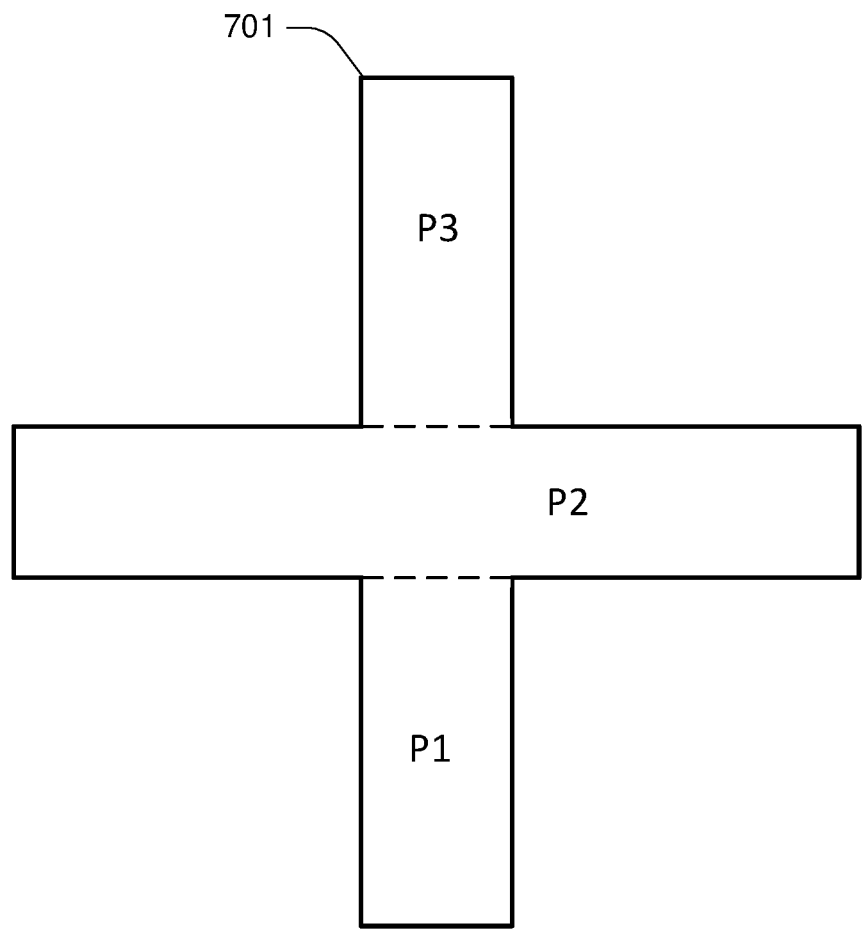
FIG. 8 is a plan view of the layer of FIG. 7b divided into three rectangular partitions.

Referring now to FIG. 4b, there is illustrated an exemplary method of performing step 405 to define a tool path based on a double layer strategy to perform partial layer completion. At step 405a, each build layer is partitioned into one or more lateral layer elements or partitions. By way of example, FIG. 8 illustrates layer 701 of cross structure 700 of FIG. 7 divided into three rectangular partitions P1-P3. In some embodiments, particularly where the structure to be formed has relatively simple geometry, the output of step 405a may be that a layer is defined by a single layer region encompassing the entire layer.

Step 405a involves, for each layer, dividing the region bounded by an external contour into smaller polygons. For example, a convex partitioning routine might be used to eliminate concave vertices, making calculation of the infill paths simpler. In some embodiments, the layer partitioning of step 405a is incorporated into the infill path calculation routine (step 405b below), but performing these processes as separate steps typically provides a simpler workflow.

Figure 9A:
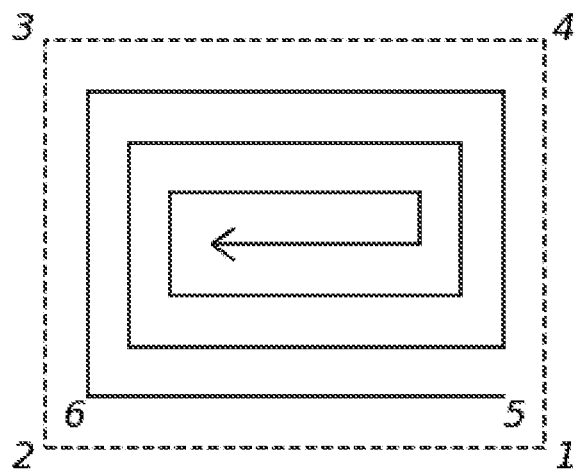
FIG. 9a is a schematic illustration of a spiral pattern infill strategy for a rectangular partition.
Figure 9B:
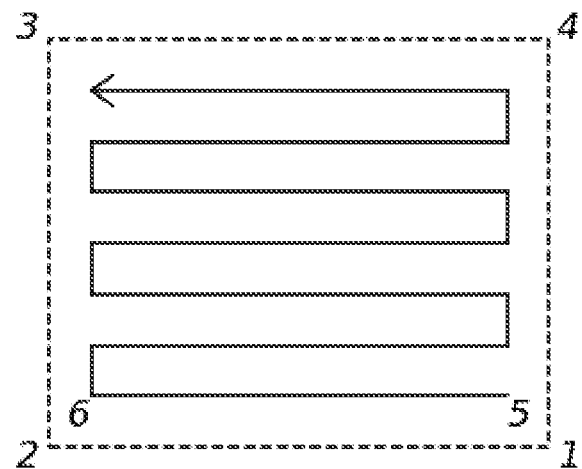
FIG. 9b is a schematic illustration of a raster pattern infill strategy for a rectangular partition.

At step 405b, a first tool path section that entirely fills a first partition is determined based on a first predefined infill strategy. The infill strategy may be any one of a plurality of known strategies such as a raster, spiral or hybrid strategy. FIG. 9a illustrates an exemplary spiral pattern infill strategy for a rectangular partition and FIG. 9b illustrates an exemplary raster pattern infill strategy for the same region. In these figures, the solid lines represent the tool path inside a rectangular contour indicated by the dashed lines. The contour vertices are labelled 1, 2, 3, 4 and the first two vertices of the infill path are labelled 5 and 6.

Taking L as the linespacing, a spiral infill strategy involves offsetting each line segment inwards by distance L until the area bound by the contour is filled. First the contour line segments are offset (dotted lines), and then the segments of the spiral pattern itself are offset to create new line segments in the spiral pattern.

A raster infill strategy involves offsetting the first contour segment by distance L, then making a small movement in the direction of the next segment, then offsetting the first segment, and so on.

Figure 10A:
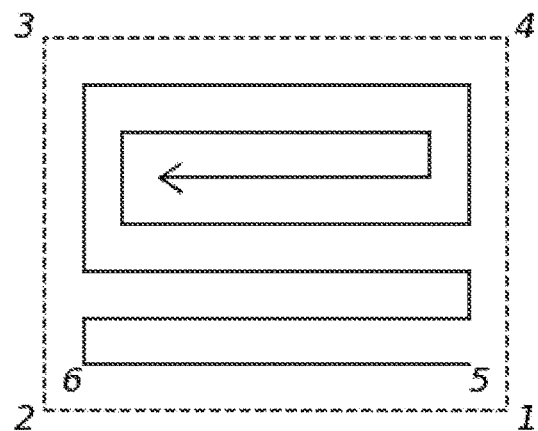
FIGS. 10a-10c are schematic illustrations of three exemplary hybrid infill patterns used to fill a rectangular partition.
Figure 10B:
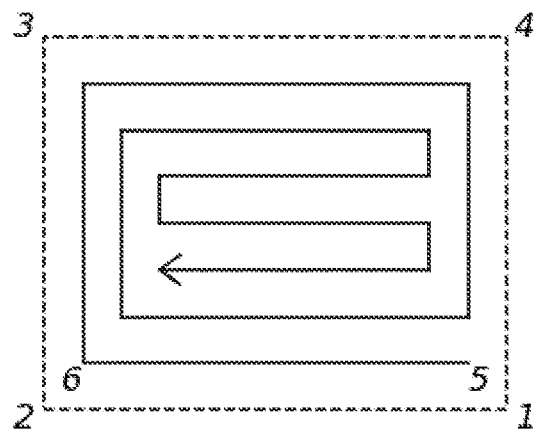
Figure 10C:
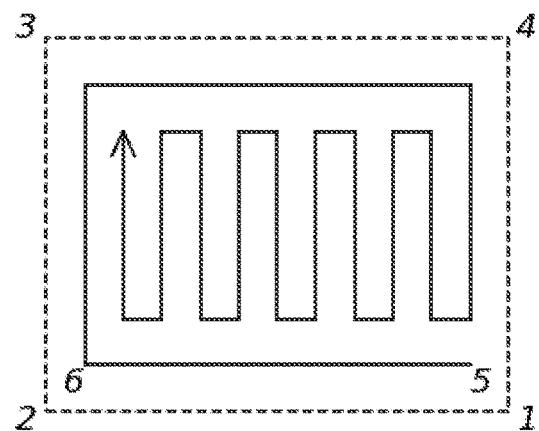

A hybrid infill pattern uses a more arbitrary combination of full movements and short movements so that some parts look like spirals, and other parts like rasters. FIGS. 10a-10c illustrate three exemplary hybrid infill patterns used to fill a rectangular partition.

Note that the end point is in different locations for each fill strategy. In this way, a computer algorithm can use different raster and spiral combinations to reach a point adjacent to the start point of an adjacent partition, e.g. in the layer above or below.

At step 405c, a second tool path section that entirely fills a second layer region is determined based on a second predefined infill strategy. The second predefined infill strategy may be the same or different to the first predefined infill strategy. The second layer region is preferably located adjacent the first layer region in the next adjacent layer (n+1). To maintain partial or complete continuity, an end point of the first tool path section within the first layer region is preferably immediately adjacent or as close as possible to a corresponding starting point of the second tool path section. This is illustrated schematically in FIG. 11, which illustrates tool path sections of the same square-shaped layer region of two adjacent layers. As illustrated, in layer n, the tool path section extends from point A to point B while in layer n+1, the tool path section extends from point B back to point A to provide a continuous tool path across two adjacent layer regions.

Figure 11:
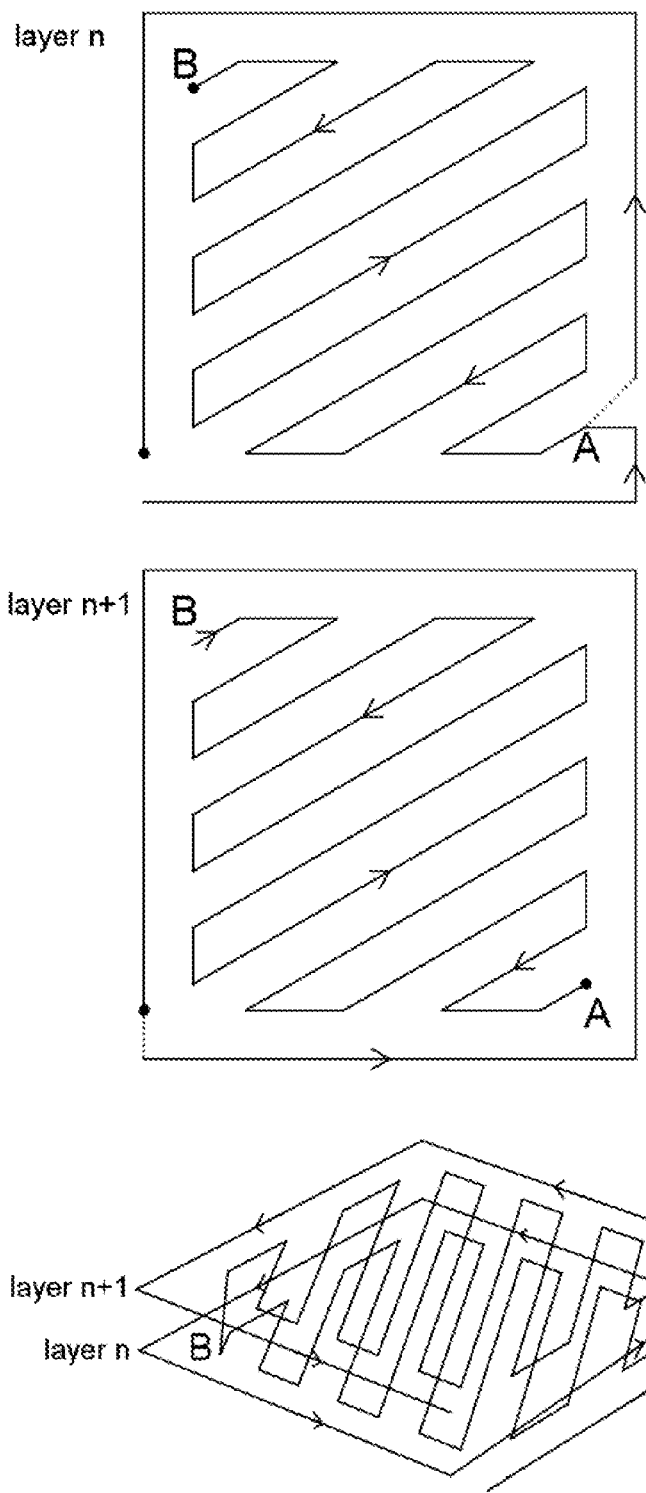
FIG. 11 is a schematic illustration of a tool path for filling a square-shaped object using a double layer infill strategy in which adjacent layers have a reverse tool path.

In the example shown in FIG. 11, the order in which the features are performed are; i) layer n bottom contour of square leading to point A, ii) layer n infill point A to point B, iii) step up to layer n+1 and infill in the reverse direction from point B to point A, iv) step down to layer n and move anticlockwise around to black dot, (v) step up to layer n+1 and perform full anticlockwise contour loop around. The end point is the same as the start point, but one layer higher. If tool head is stepped up one layer again and the pattern repeated, layer regions within the next two layers, n+2 and n+3, can be filled in a similar double layer manner prior to entirely filling either layer n+2 or n+3.

Such an infill strategy can be referred to as a double layer strategy wherein a tool path section in layer n+1 is the direct reverse of a tool path section in an adjacent layer region of adjacent layer n. Although FIG. 11 illustrates a reverse raster pattern, it will be appreciated that other reciprocal patterns are possible. For example, one double layer infill strategy might include a spiral infill pattern starting at an outer layer region point of layer n and finishing at a central layer region point of layer n. The infill strategy of an adjacent layer n+1 then includes a reverse spiral pattern which starts at the central point and finishes at the outer point.

Figure 12A:
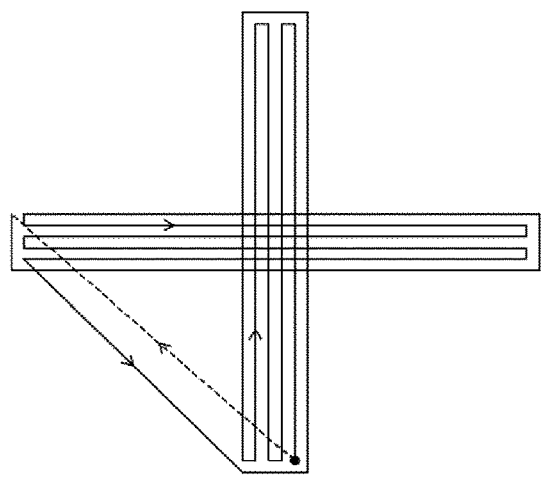
FIG. 12a is a schematic plan view of a first tool path for filling a cross-shaped structure.
Figure 12B:
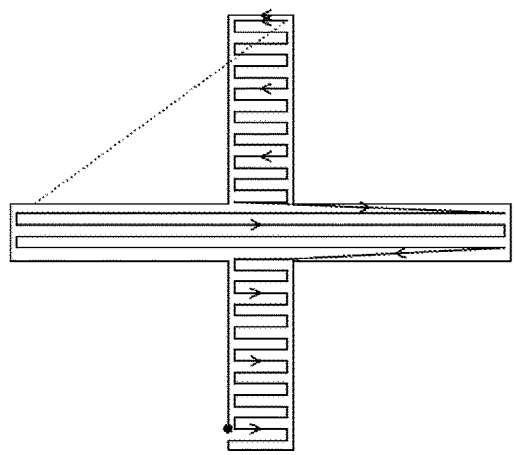
FIG. 12b is a schematic plan view of a second tool path for filling a cross-shaped structure.
Figure 12C:
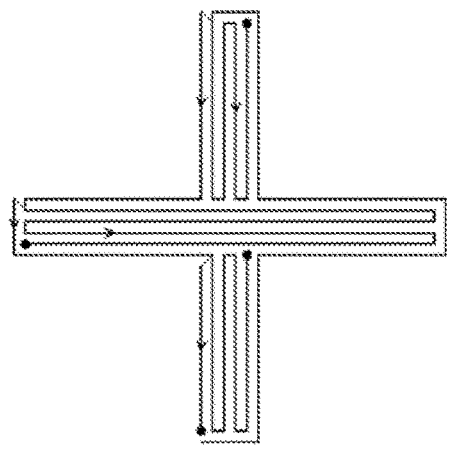
FIG. 12c is a schematic plan view of a third tool path for filling a cross-shaped structure in which the tool path is continuous and non-intersecting.
Figure 12D:
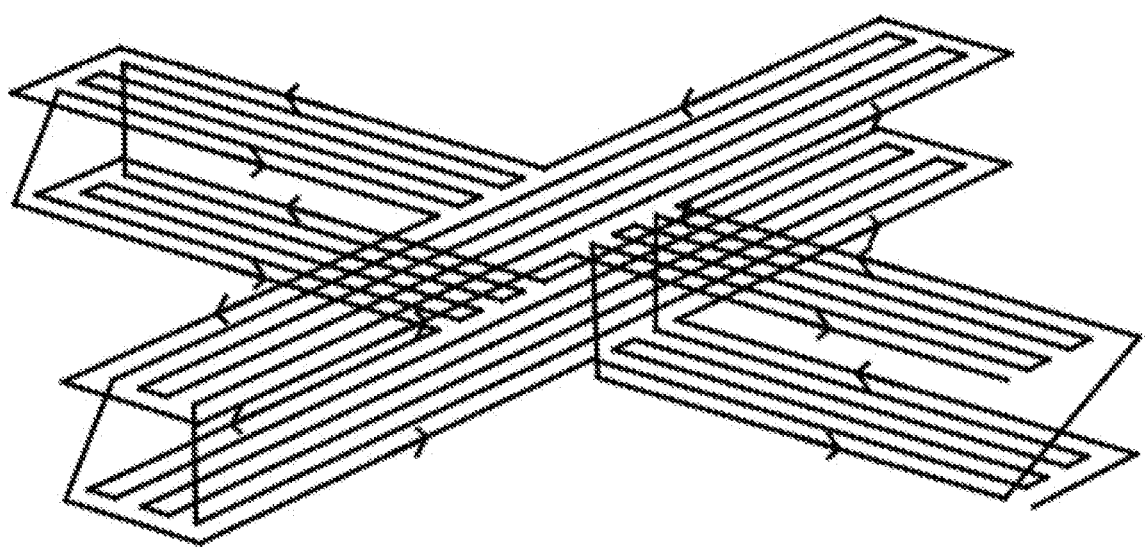
FIG. 12d is a perspective view of the third tool path from FIG. 12C showing two layers of the cross-shaped structure.

FIGS. 12a to 12c illustrate three example tool paths that can be employed to fill layer 701 of cross structure 700 illustrated in FIG. 7. Here, arrows indicate the direction of tool head travel, while a dot signifies a transition out of the current layer into the layer above. A dashed line represents a transitional movement from the layer above or below into the current layer. The path strategies of FIGS. 12a and 12b represent poor strategies that do not leverage the layer partitioning of step 404 illustrated in FIG. 8. The path strategy of FIGS. 12c and 12d represents an improved strategy that does leverage layer partitioning and provides a continuous non-intersecting path.

FIG. 12a illustrates a poor tool path strategy, which treats the cross as two rectangles. This tool path will result in double the amount of material in the central square, where the two rectangles overlap. If the material is being deposited by cold spray, a high level of porosity would result due to the top surface of the build being uneven in height and no longer perpendicular to the spray nozzle. Furthermore, the excess material would need to be removed periodically to continue the build process.

FIG. 12b illustrates a raster pattern, which avoids the doubling up problem, but is nevertheless an intersecting path strategy. Where abrupt changes in dimension occur, the infill path intersects the contour. The path also leaves the area bound by the external contour in the transition from one layer to the next. Thus, this tool path strategy is also not optimised.

FIG. 12c illustrates a continuous, non-intersecting path that fills the cross structure by following the layer partitioning illustrated in FIG. 8. The raster infill patterns are oriented lengthwise inside each partition. The contour loop path is used to move from one partition to another. There is one transition from the layer shown to the layer above in each partition plus another at the external contour on the left (four layer transitions in total). The layer above contains an identical raster pattern, but the travel direction is in the reverse direction. FIG. 12d illustrates the same tool path, but in a 3D view of two adjacent layers.

Where a tool path is continuous, as in the strategy of FIGS. 12c and 12d, a flow of printing material to the printing head 114 is able to be maintained throughout a printing process. This avoids unwanted deactivations (or "jumps") of the printing head 114, which can disturb the material flow process. Depending on the feeding mechanism, turning the feed off and on again may not result in a near-instantaneous response. In powder-fed processes, when the feed is resumed there is often a period of non-constant or unstable material flow. In the cold spray process, sudden disturbances in powder injection produce fluctuations in the supersonic gas stream, resulting in defects and excess porosity in the deposit, or nozzle blockages. In pump-driven feeding of viscous fluids, it is difficult to cease flow due to accumulation of pressure. This can also reduce the amount of material deposited, the processing time and the energy required to perform the manufacturing process.

It is pointed out that, in following the tool path strategies illustrated in FIGS. 11 and 12, regions of two adjacent layers of the structure are partially filled before either of those layers are entirely filled. This is distinct from prior art techniques wherein a structure is manufactured purely on a layer-by-layer basis and adjacent layers are not commenced until a prior layer is complete. This additional flexibility in the tool path provides for a more continuous tool path which has advantages in time, cost and manufacturing quality. In addition, the partial layer completion technique provides for optionally defining more inter-layer tool crossings along the build direction. This can enhance the strength of the overall build by reducing stratification as the layer crossings can act as reinforcements along the build direction.

Conventionally 3D printed parts often suffer mechanical anisotropy due to inferior Z-direction (build direction) properties compared to properties measured in directions parallel to the X-Y (build layer) plane. For example, in 3D printing of common polymers such as acrylonitrile butadiene styrene (ABS) and polylactic acid (PLA) the build direction strength is often 50-75% lower than the in-plane strength due to lack of inter-diffusion of polymer chains across layers (see C. Duty, J. Failla, S. Kim, T. Smith, J. Lindahl, V. Kunc, *Additive Manufacturing* 2019, 27, 175-184).

Another example is 3D printing of fibre-reinforced polymers, such as carbon-fibre reinforced polymer, glass-fibre reinforced polymer or Kevlar-reinforced polymer 3D printing. Although sometimes described as continuous fibre printing, fibre laying is in fact interrupted at the completion of every layer and is also usually interrupted many times within each layer. In order to compensate for this, it has been suggested that parts can be deliberately printed with vertical voids, into which pins are inserted, in a process known as 'z-pinning' (see Roschli, Alex C., Duty, Chad E., Lindahl, John M., Post, Brian K., Chesser, Phillip C., Love, Lonnie J., and Gaul, Katherine T. *Increasing Interlaminar Strength in Large Scale Additive Manufacturing*. United States: N. p., 2018. Web.). However, the inventors have identified that incorporating layer crossings into the toolpath offers a simpler way of improving Z-direction properties without needing to greatly modify or add cumbersome steps to the manufacturing process.

In some embodiments, it may be advantageous to entirely fill a particular layer before filling adjacent layers. It will be appreciated that different infill strategies may be employed across different layer regions and different layers such that some layers are entirely filled sequentially while others are only partially filed at one time. For example, a hybrid of spiral and raster patterns may be performed on different layer regions. In one specific example, raster patterns re-oriented 90 degrees in each successive layer are called cross-hatching patterns.

At step 405d, a determination is made as to whether the tool path is complete or not. If there are additional layer regions to fill, then steps 405b and 405c are repeated for all layer regions by matching tool path section start points with a corresponding tool path section end point of a previous tool path section of an adjacent layer or layer region. By matching, what is meant is that the start and end points of respective tool path sections are sufficiently close as to either minimise or avoid deactivation or jumps of the printing head 114.

To achieve a continuous path between tool path sections, it is advantageous for the tool path strategy to loop around an external contour of the structure in connecting partition start and end points. This contour looping reduces the chances of the individual partitions or layer regions being disjointed and increases the ability to provide a continuous path. The external contour path is therefore divided into sections that provide links between the end points and starting points of each section of infill path.

Hamiltonian Tool Path Strategy

Figure 4C:
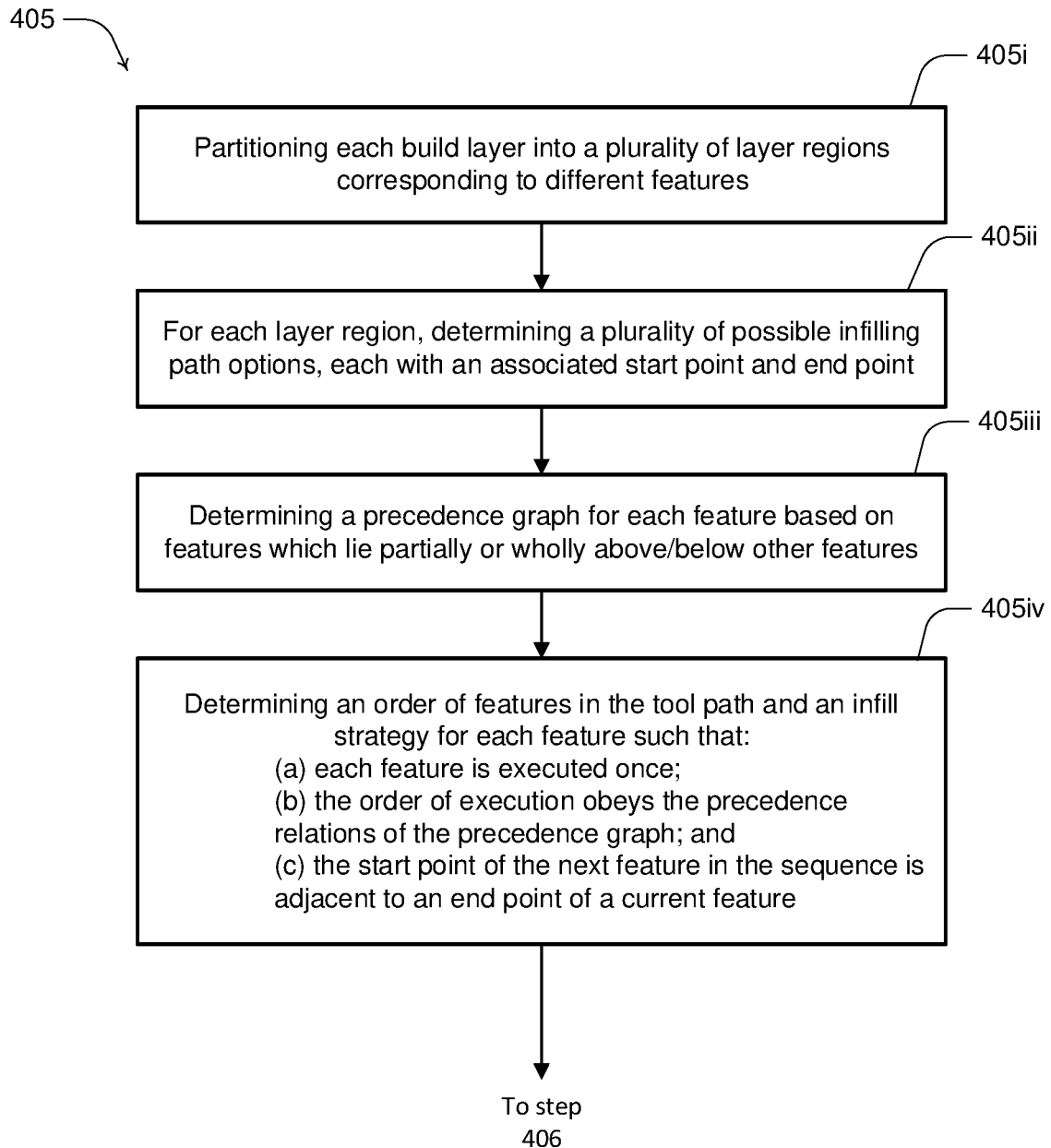
FIG. 4c is a process flow diagram illustrating the primary steps in a second method of performing a partial layer approach to define a tool path in the method of FIG. 4.

Referring now to FIG. 4c, there is illustrated an alternate exemplary method of performing step 405 to define a tool path based on a Hamiltonian path problem strategy to perform partial layer completion.

At step 405i, each build layer is partitioned into a plurality of lateral layer regions or partitions. Each layer region is determined based on a corresponding 'elements'. As described below, each element represents a node in a Hamiltonian path problem. Elements may include sub-areas of the structure or a layer that need to be infilled before other regions. These are made by dividing the region bounded by the external contour path into smaller areas. Elements may also include connecting paths between infill sections. For example, these may be sections of the external contour loop path. Elements may also include loop paths, such as internal contour loops representing paths that may go around the perimeter of holes formed from internal contours. Loop paths end in the same place that they started. Elements can also include a section of an external contour loop. The sections of the external contour loops provide linking paths between partitions that lie adjacent to the contour.

At step 405ii, for each layer region, a plurality of possible infilling path options are determined for each layer region. Each path option has an associated start point and end point and optionally a preferred or predefined infill strategy. Elements such as contour path sections will also have a list of possible start points and end points.

Figure 4D:
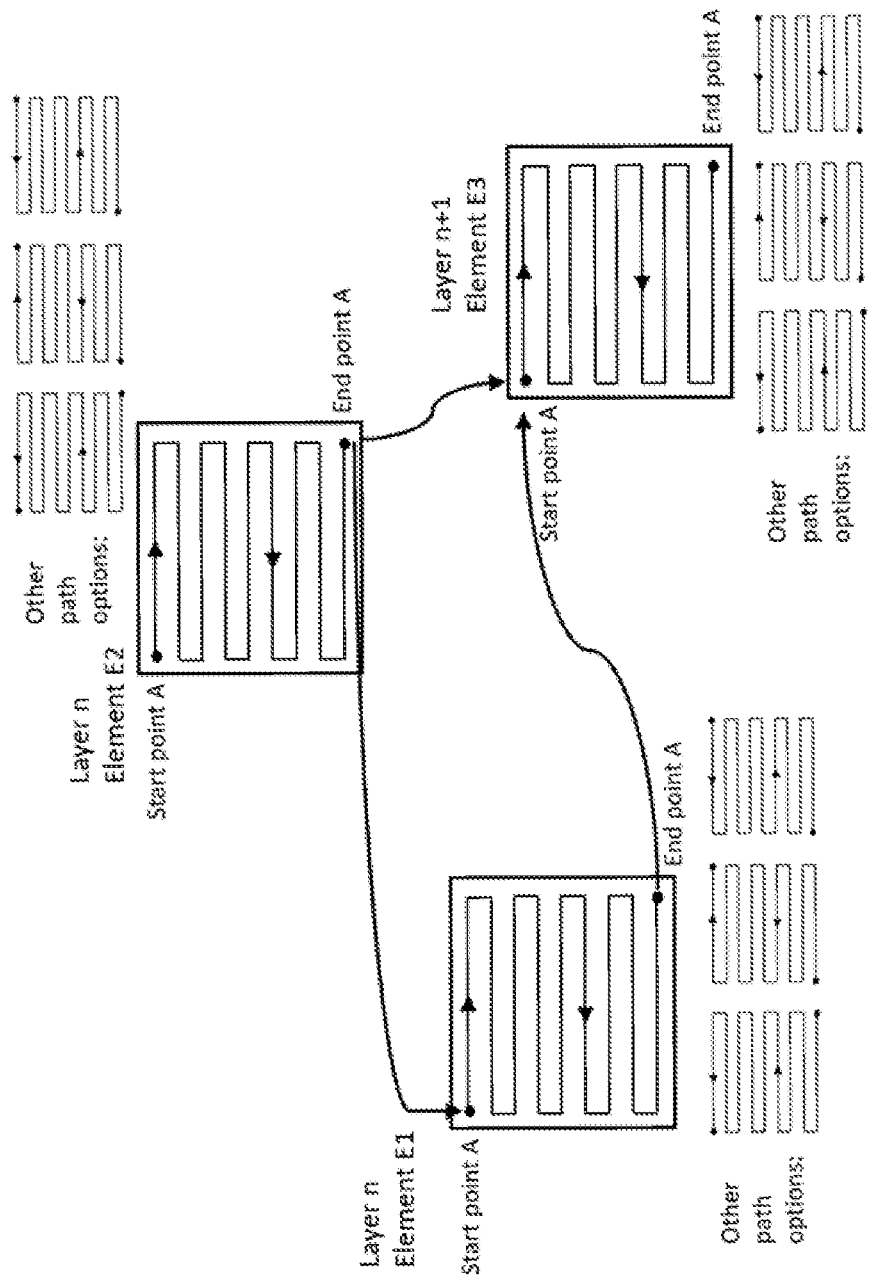
FIG. 4d is an example of an adjacency graph created for the second partial layer approach of FIG. 4c, the graph includes three elements, each in one of two layers.

FIG. 4d provides an example of an adjacency graph created with three elements, each in one of two layers. In practice, there will be many more layers and more elements within each layer. Each element can be executed in a number of ways, while keeping within constraints such as a specified raster line direction or a direction along a contour path. Each path option has a start point and an end point. A list of possible start points and corresponding end points can be assembled for each element. A test for adjacency can then be made based on the Euclidian distance between the end point of one element with the start point of another.

At step 405iii, a precedence graph is determined for each element based on elements which lie partially or wholly above/below other elements in the structure. No element is executed until all underlying elements are completed. However, different regions of layers above a particular layer may be completed before all regions of that particular layer are complete. In this manner, a partial layer completion approach is followed which does not restrict the tool path strategy to layer-by-layer completion.

Figure 4E:
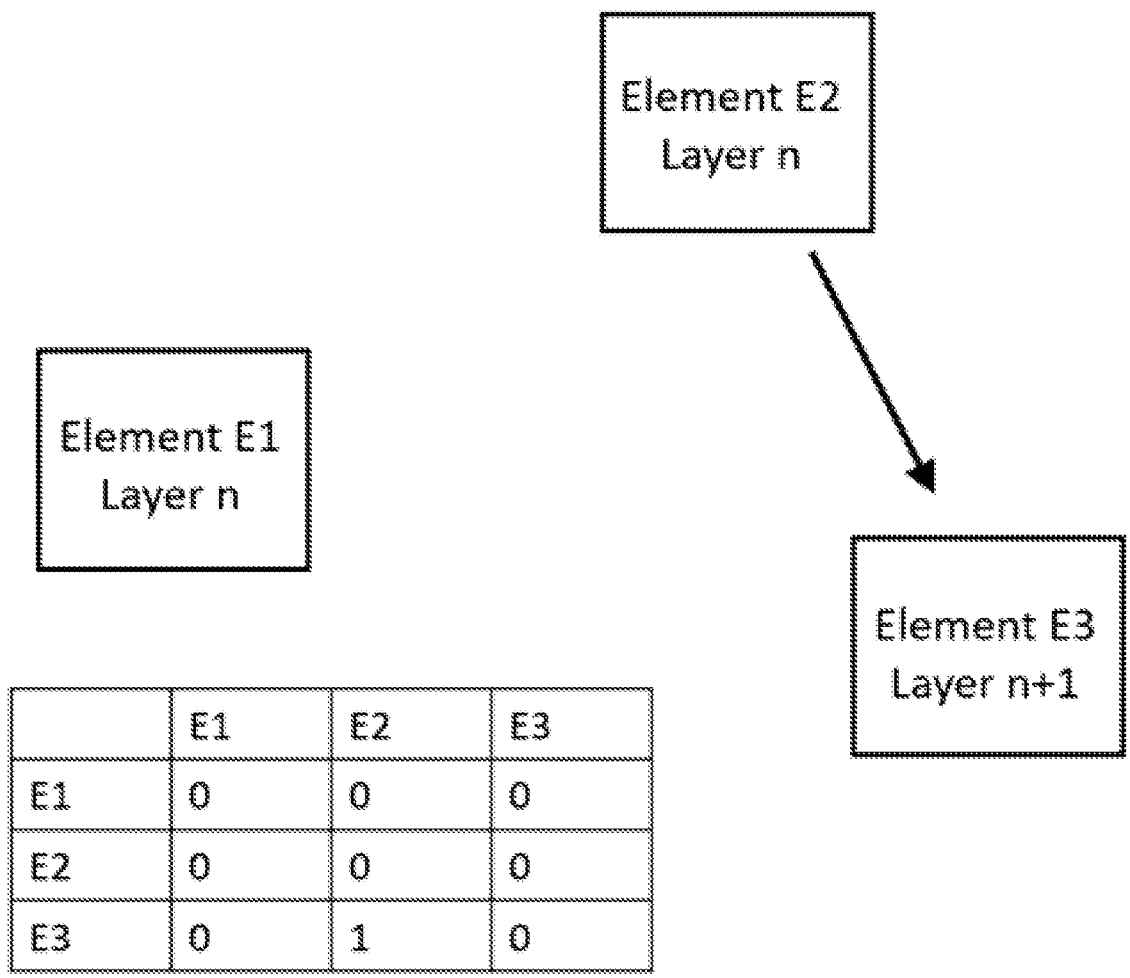
FIG. 4e is a precedence graph that could be applied for three partitions such as the three elements of FIG. 4d.

FIG. 4e shows a precedence graph that might apply for the same set of three partitions. The graph shows that element E2 in layer n lies partially or wholly below E3 in layer n+1, whereas E1 in layer n does not. Therefore, before E3 can be executed, a check must be performed to confirm that E2 is already complete. There is no such constraint on E1.

At step 405iv, an order of element execution in the tool path is determined as well as a choice of infill option for each layer region. This determination may be based on a requirement that:
 a) each element is executed only once;
 b) the order of execution obeys the precedence relations determined in the precedence graph during step 405iii; and
 c) an end point of a current element in the sequence is adjacent to a start point of a current element.

Figure 4F:
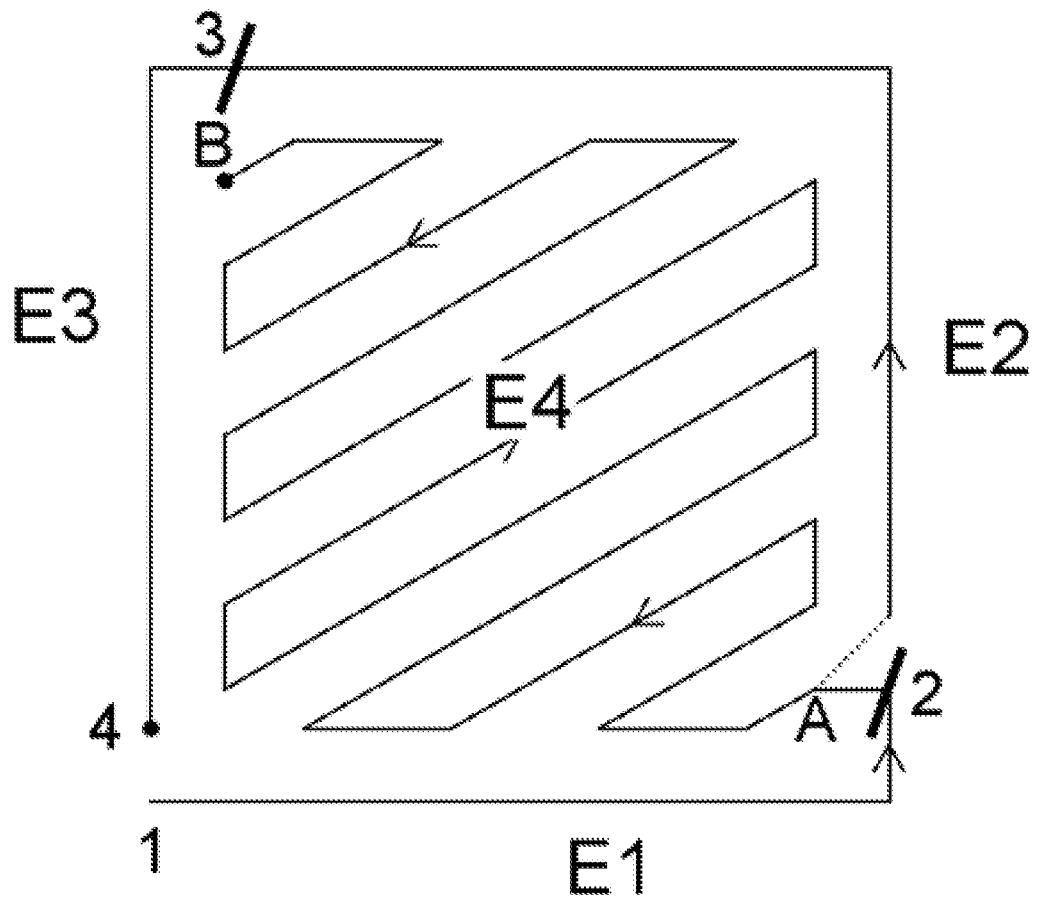
FIG. 4f illustrated layer n of a square shaped region, illustrating how it can be divided into four elements.

FIG. 4f shows layer n of the square-shaped region illustrated in FIG. 11, illustrating how it can be divided into four elements. Three elements, $E1_n$, $E2_n$ and $E3_n$ comprise the external contour loop path. Thick strokes at point 2 & 3 indicate the locations where the contour path is split into sections. $E1_n$ extends from the layer start point (1) to point 2, $E2_n$ from point 2 to 3 and $E3_n$ from point 3 to the contour end point 4. $E4_n$ is the area inside the square which is shown to be filled using a raster pattern from point A to point B. An alternative infill option for $E4_n$ is to traverse the same path but in the reverse direction, from point B to point A. Layer n+1, being identical in shape to layer n will have equivalent elements, which are denoted $E1_{n+1}$, $E2_{n+1}$, $E3_{n+1}$ and $E4_{n+4}$.

By way of example, the requirement of end point/start point adjacency says that $E4_n$ may follow $E1_n$ but not vice versa. If the direction of the path in E4 is reversed, i.e. from point B to point A, then $E4_n$ may not follow $E1_n$.

The precedence matrix for this set of elements is given in Table 1 below. Table 1 indicates, for example, that $E1_{n+1}$ cannot be performed until $E1_n$ has been performed because $E1_n$ lies directly underneath.

TABLE 1

|  | $E1_n$ | $E2_n$ | $E3_n$ | $E4_n$ | $E1_{n+1}$ | $E2_{n+1}$ | $E3_{n+1}$ | $E4_{n+1}$ |
| --- | --- | --- | --- | --- | --- | --- | --- | --- |
| $E1_n$ | 0 | 0 | 0 | 0 | 0 | 0 | 0 | 0 |
| $E2_n$ | 0 | 0 | 0 | 0 | 0 | 0 | 0 | 0 |
| $E3_n$ | 0 | 0 | 0 | 0 | 0 | 0 | 0 | 0 |
| $E4_n$ | 0 | 0 | 0 | 0 | 0 | 0 | 0 | 0 |
| $E1_{n+1}$ | 1 | 0 | 0 | 0 | 0 | 0 | 0 | 0 |
| $E2_{n+1}$ | 0 | 1 | 0 | 0 | 0 | 0 | 0 | 0 |
| $E3_{n+1}$ | 0 | 0 | 1 | 0 | 0 | 0 | 0 | 0 |
| $E4_{n+1}$ | 0 | 0 | 0 | 1 | 0 | 0 | 0 | 0 |

Taking into account both adjacency and precedence, a solution to this problem, which is depicted in FIG. 11 has the following order of elements; $E1_n$, $E4_n$, $E4_{n+1}$, $E2_n$, $E3_n$, $E1_{n+1}$, $E2_{n+1}$, $E3_{n+1}$. The path option for $E4_n$ goes in the direction A to B, while the path option for $E4_{n+1}$ goes in the direction B to A.

By following steps 405i to 405iv, a Hamiltonian path representing a path in the precedence graph that visits each vertex exactly once can be determined.

Once all tool path sections for all layer regions of the structure are completed, they are combined to define a single tool path. In preferred embodiments, the tool path strategies adopted for each layer region are defined so that the end tool path is continuous and non-intersecting with other sections of the path. However, it will be appreciated that the tool path may be defined to optimize for other parameters, such as:
  Optimizing a printing time for forming the three dimensional structure by minimizing the time during which the printing head is not printing material.
  Minimizing a number of printing tool jumps along the tool path during the forming of the three dimensional structure. Jumps occur where there is a sufficient distance between start and end points such that the flow of material from printing head 114 must be temporarily deactivated.
  Minimizing a number of path intersections along the tool path. Path intersections can result in unwanted additional material being deposited on the structure if the material feed is not stopped. This additional material typically needs to be separately removed through a filing or shaving process before additional layers can be deposited or after all layers have been deposited.

Minimizing the number of paths that leave an area bounded by the external contour, i.e. 'drawing' outside the 3D model. For example, the diagonal lines in FIGS. 12a & 12b represent paths that leave the external contour of the object being manufactured. At best, these external paths cause material wastage and, at worst, they result in unwanted deposition onto lower layers.

Minimizing an amount of printing material used for forming the three dimensional structure. A continuous and non-intersecting path provides for the minimal required printing material. However, if such a continuous and non-intersecting path is not possible (say, for a complex structure to be formed), then different path options may be available which require different amounts of printing material.

Optimizing the number and the degree of printing tool turns along the tool path. Sharper turns in the tool path require either higher acceleration of the printing head or slower movements. The former can have negative effects on the material deposition process and the latter can produce longer printing times.

Distributing the printing process across different regions of the structure throughout the printing process. Excessive printing of one localised region of the structure can cause overheating which may result in structural deformities or weaknesses in the final product.

structure can be minimized to equal the number of sub-regions. The sub-regions must be correctly chosen so that there is exactly one external contour in each layer after slicing.

For more complex structures having been divided into multiple volume structures at step 403, steps 404 and 405 are repeated for each volume structure.

Returning to FIG. 4a, finally, at step 406, a printing tool control algorithm is generated based on the defined tool path. The algorithm includes a series of control commands for controlling the printing head 114 to move along the tool path to form the three dimensional structure. This algorithm is able to be performed by control computer 118 and the control commands transmitted as control signals 120, 122 and 124 to execute the printing process via robotic arms 104 and 116 and spray gun 102.

The algorithm output at step 406 is a robot program for performing additive manufacturing. It may be written in G-code (Computer Numerical Control-CNC code), or some other language, depending on the particular robot system. For example, robots developed by ABB Robotics run on ABB's proprietary programming language called RAPID.

Below are the first lines of a RAPID robot program that was created by method 400. Method 400 may be used to output in other programming languages, e.g. G-code.

```
PROC main()
! RAPID code created from arrow.STL
!
! Fixed parameters:
! Layer height 3.0 mm
! Line spacing 2.0 mm
! Nozzle angle for contour passes 20.0 degrees
! Variable declaration:
VAR speeddata vcontour := [50.0, 500, 5000, 500 ];
VAR speeddata vfill := [50.0, 500, 5000, 500 ];
VAR speeddata vskip := [100.0, 500, 5000, 500 ];
VAR zonedata zcustom := [ FALSE, 2.5, 40, 40, 10, 35, 5 ];
! Layer 1
MoveL RelTool(offs(plate_top_left, 0.0, 0.0, -0.0),0,0,0 \Rx:=0\Ry:=0\Rz:=0), vcontour, zcustom, tPGgun_stationary\WObj:=wobj_plate;
MoveL RelTool(offs(plate_top_left, 79.76, 69.12, -0.0),0,0,0 \Rx:=1.42\Ry:=19.95\Rz:=0), vcontour, zcustom,
tPGgun_stationary\WObj:=wobj_plate;
MoveL RelTool(offs(plate_top_left, 104.55, 40.52, -0.0),0,0,0 \Rx:=1.42\Ry:=19.95\Rz:=0), vcontour, zcustom,
tPGgun_stationary\WObj:=wobj_plate;
MoveL RelTool(offs(plate_top_left, 105.0, 40.92, -0.0),0,0,0 \Rx:=0\Ry:=0\Rz:=0), vfill, zcustom, tPGgun_stationary\WObj:=wobj_plate;
MoveL RelTool(offs(plate_top_left, 106.73, 42.92, -0.0),0,0,0 \Rx:=0\Ry:=0\Rz:=0), vfill, zcustom, tPGgun_stationary\WObj:=wobj_plate;
MoveL RelTool(offs(plate_top_left, 103.27, 42.92, -0.0),0,0,0 \Rx:=0\Ry:=0\Rz:=0), vfill, zcustom, tPGgun_stationary\WObj:=wobj_plate;
MoveL RelTool(offs(plate_top_left, 101.53, 44.92, -0.0),0,0,0 \Rx:=0\Ry:=0\Rz:=0), vfill, zcustom, tPGgun_stationary\WObj:=wobj_plate;
MoveL RelTool(offs(plate_top_left, 108.47, 44.92, -0.0),0,0,0 \Rx:=0\Ry:=0\Rz:=0), vfill, zcustom, tPGgun_stationary\WObj:=wobj_plate;
MoveL RelTool(offs(plate_top_left, 110.2, 46.92, -0.0),0,0,0 \Rx:=0\Ry:=0\Rz:=0), vfill, zcustom, tPGgun_stationary\WObj:=wobj_plate;
MoveL RelTool(offs(plate_top_left, 99.8, 46.92, -0.0),0,0,0 \Rx:=0\Ry:=0\Rz:=0), vfill, zcustom, tPGgun_stationary\WObj:=wobj_plate;
```

Optimizing a number of layer crossings to enhance the strength of the overall build, particularly in the Z-direction (the build direction). The number of layer crossings can be increased by dividing each layer into a greater number of finer partitions and using transitions between layers to connect them into a fully continuous path.

Figure 13A:
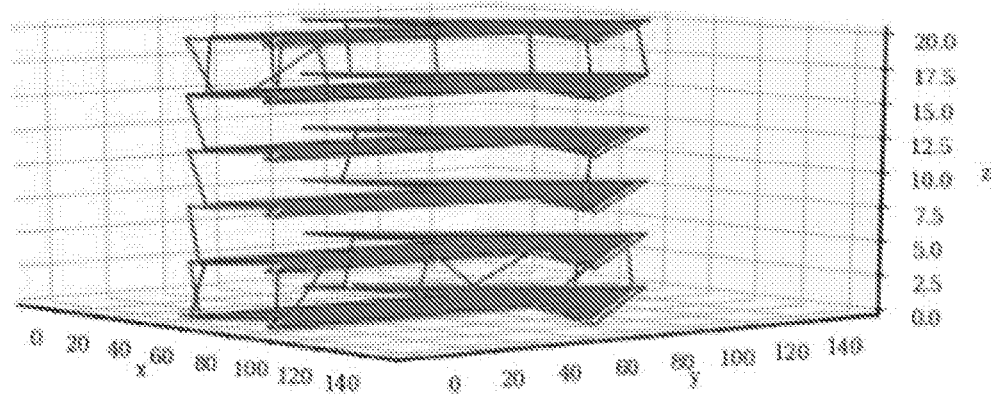
FIG. 13a is a side schematic view of a six layered arrow-shaped object showing a continuous path for manufacturing the object.
Figure 13B:
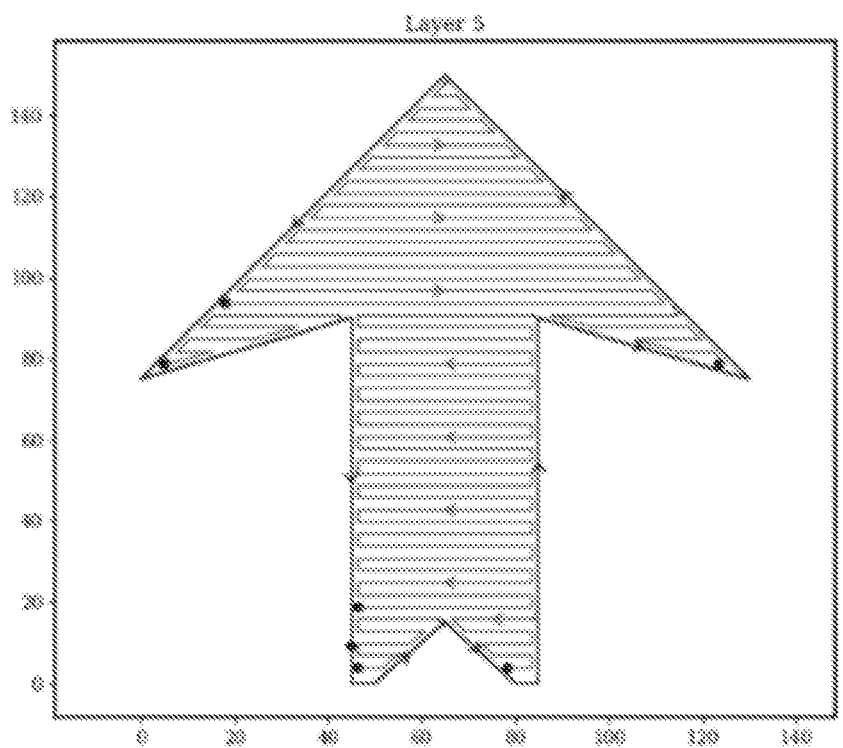
FIG. 13b is a plan view of a layer of the arrow-shaped object of FIG. 13a illustrating a raster style tool path infill strategy.

FIG. 13a illustrates a continuous path for manufacturing the arrow shaped object 500 of FIG. 5. FIG. 13a illustrates six layers and shows the location of transitions between the adjacent layers. FIG. 13b illustrates a raster style tool path infill strategy for one of the layers of FIG. 13a. Here the dots indicate a transition to/from an adjacent layer.

If the three dimensional structure is divided into volumetric sub-regions, the number of tool jumps for the entire It will be appreciated that method 400 forms an initial procedure for performing an additive manufacturing process. In this regard, one aspect of the present disclosure relates to a method of controlling a printing tool such as system 100 in an additive manufacturing process. This method includes:

a) executing, by a computer processor such as control computer 118, a printing tool control algorithm generated by method 400; and b) generating, in response to the printing tool control algorithm, electrical signals (e.g. signals 120, 122 and 124) to control a printing tool to move along the defined tool path to form a predefined three dimensional structure.

In addition to simply controlling the position and flow of the printing head 114, the printing tool control algorithm may also include instructions to vary one or more build parameters across different build layers or layer regions. For example, a line spacing and/or a motion (e.g. minimum velocity or maximum acceleration) of the printing head 114 may be controlled to vary between one or more layer regions. Although these parameters may change during the printing process, the decision of when and where to change the parameters is predefined and set in the tool path planning process prior to the commencement of printing.

It will be appreciated that method 400 may be implemented as a computer program comprising instructions which, when executed by a computer such as control computer 118, cause the computer to carry out method 400. Method 400 may also be embodied as a set of instructions stored on a computer-readable storage medium. When the storage medium is interfaced with a computer (such as control computer 118, the instructions may be executed by a computer to cause the computer to carry out method 400.

The above described disclosure provides a more sophisticated tool path strategy than currently available which allows for multiple transitions between adjacent layers and removes the previous limitation of sequential layer completion to achieve a continuous tool path. It allows defining a tool path which fills the three dimensional structure by filling one or more layer regions of higher build layers along the build direction before filling all layer regions of at least one lower build layer. I.e. it allows for laying down of material in layer n+1 or n+2, etc. before layer n has been fully filled.

Furthermore, the object may be partitioned into sub-volumes prior to layer slicing to reduce the problem to subcomponents that can each be printed continuously. Furthermore, volumetric subdivision allows for multiple build directions, thus taking advantage of a robot's ability to hold a part in any orientation during a build.

For multi-material builds, the volume partitioning algorithm, in combination with non-planar slicing, may be used to maximise the continuity of printing of one material component, i.e. to reduce the number of changeovers from one material to another within an interconnecting, multi-material build.

Arrow Cold Spray Example

An example tool path for producing the arrow shape shown in Figure was demonstrated in practice using cold spray metal deposition. A Plasma Giken PCS-1000 L high pressure cold spray system was used to spray aluminium onto a 200×200×6 mm aluminium build plate. The cold spray gun was stationary while the build plate was moved in front of the nozzle by an ABB IRB4600 robot arm.

The tool path planning algorithm was written in Python. The arrow STL file was sliced at 0.5 mm layer height. The continuous path problem was solved using a double layer strategy. A raster pattern infill pattern was used with 2 mm linespacing, with raster angle rotating 90° every 2 layers. A 50 mm/s tool speed was used. After calculating the tool path, the Python program output an ABB RAPID module file, which was later opened in the ABB RobotStudio software.

Prior to cold spray, the aluminium build plate was grit blasted in order to improve adhesion of the cold spray material. The cold spray powder feeder was loaded with pure aluminium powder with average particle size 36.1 µm. Nitrogen gas was used as the accelerating gas. The cold spray gas settings were; 400° C. and 4.0 MPa. The standoff distance between the nozzle exit and build surface was maintained at 30 mm. Total build time was approximately 20 minutes.

Figure 13C:
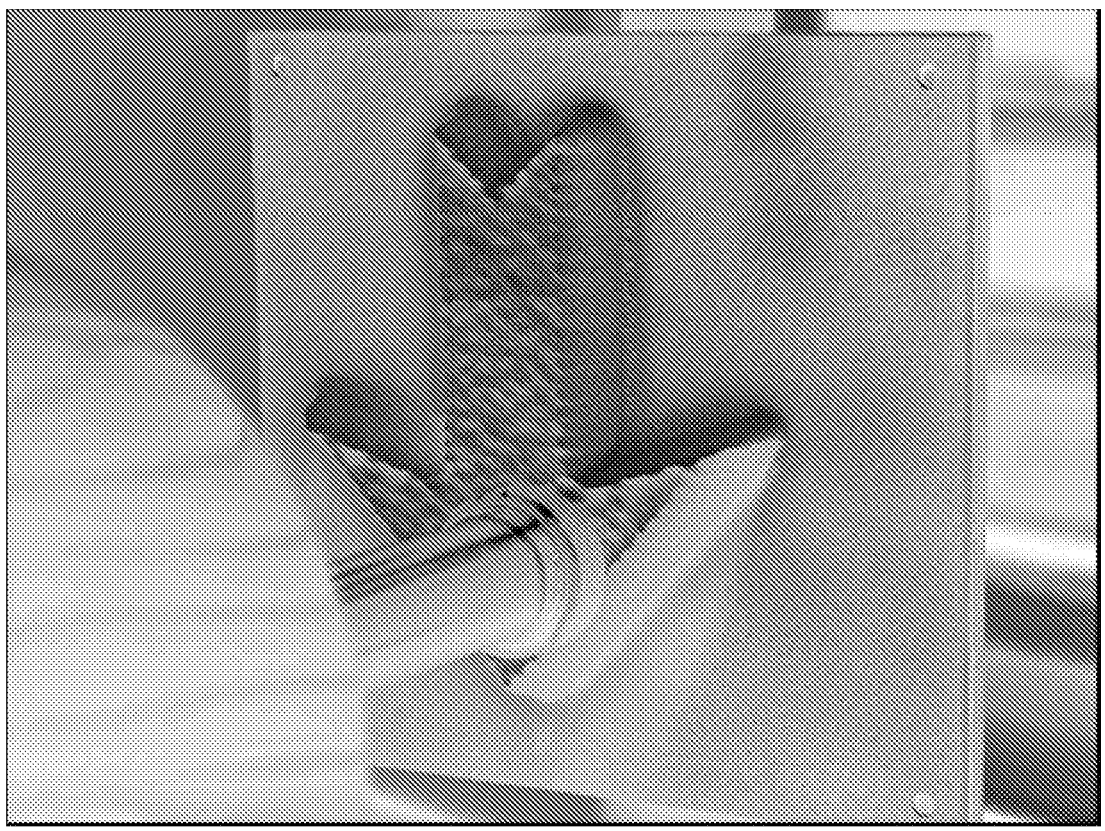
FIG. 13c is an image of the arrow-shaped object of FIGS. 13a and 13b built using a double layer tool path strategy as described herein.

FIG. 13c illustrates the finished structure and shows that there was no aluminium deposited onto the build plate outside the area of the arrow. Furthermore, the top surface of the build was approximately flat, allowing for some degree of height variation due to powder feed fluctuations. This demonstrates that the tool path planning algorithm implementing partial layer completion had succeeded in filling every area of the part evenly. Had the tool path included overlaps, repeated path sections or crossings from one location to another the arrow would have exhibited overbuilt and underbuilt features.

Interpretation

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

Use of the terms "computer" and the like in this specification may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Furthermore, the computer may operate as a standalone device or may be connected, e.g., networked to other processor(s) and/or computer(s). In a networked deployment, the computer(s) may operate in the capacity of a server or a user machine in server-user network environment, or as a peer machine in a peer-to-peer or distributed network environment. The computer(s) may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Reference throughout this specification to "one embodiment", "some embodiments" or "an embodiment" means that a particular feature, structure or characteristic described in connection with the embodiment is included in at least one embodiment of the present disclosure and potentially multiple embodiments. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner. In this manner, when any methods described herein include several steps, no ordering of such elements is implied, unless specifically stated.

Thus, while there has been described what are believed to be the preferred embodiments and applications of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The invention claimed is:

1. A method of determining a tool path for controlling a printing tool, the method comprising:
   (a) receiving an input file containing data indicative of a three dimensional structure to be formed;
   (b) dividing the three dimensional structure into a plurality of build layers, wherein build layers are separated in a build direction and each build layer extends laterally relative to the build direction, each build layer including an external contour defining the intersection of the build layer with an exterior surface of the three dimensional structure;
   (c) defining a tool path which fills the three dimensional structure, wherein for at least two adjacent layers, the path includes partially filling one or more higher build layers along the build direction before entirely filling at least one lower build layer using a continuous and non-intersecting tool path; and
   (d) generating a printing tool control algorithm including a series of control commands for controlling the printing tool to move along the tool path to form the three dimensional structure.

2. The method according to claim 1, wherein (c) includes:
   (c)(i) partitioning each build layer into one or more layer regions;
   (c)(ii) determining, based on a first predefined infill strategy, a first tool path section that entirely fills a first layer region;
   (c)(iii) determining, based on a second predefined infill strategy, a second tool path section that entirely fills a second layer region that is adjacent the first layer region in either the same layer or an adjacent layer, wherein an end point of the first tool path section within the first layer region is immediately adjacent a corresponding starting point of the second tool path section; and
   (c)(iv) repeating (c)(ii) and (c)(iii) for all layer regions by matching tool path section start points with a corresponding tool path section end point of a previous tool path section of an adjacent layer or layer region to define a single tool path.

3. The method according to claim 2, wherein (c)(iv) includes defining contour loop paths which extend around an external contour of the three dimensional structure between adjacent partition start and end points.

4. The method according to claim 1, wherein (c) includes:
   (c)(i) partitioning each build layer into a plurality of layer regions based on one or more features of the three dimensional structure or build process;
   (c)(ii) for each layer region, determining a plurality of possible infilling path options, including start and end points within the layer region;
   (c)(iii) determining a precedence graph for each feature based on features which lie partially or wholly above/below other features in the three dimensional structure; and
   (c)(iv) determining an order of execution in the tool path that obeys precedence relations determined in the precedence graph such that each feature is executed only once, wherein an end point of a current feature in the sequence is adjacent to a start point of a next feature.

5. The method according to claim 4, wherein the structure includes one or more features, and wherein at least one of the features includes sub-areas of the structure that are infilled before other regions.

6. The method according to claim 4, wherein the one or more features of the three dimensional structure include connecting paths between infill sections.

7. The method according to claim 4, wherein the one or more features include loop paths that loop around structural features.

8. The method according to claim 4, wherein the infilling path options include an infill strategy.

9. The method according to claim 1, wherein the three dimensional structure forms part of a larger three dimensional object.

10. The method according to claim 1, wherein the tool path is continuous such that a flow of printing material to the printing tool is maintained throughout a printing process.

11. The method according to claim 8, wherein the infill strategy includes a double layer strategy wherein a tool path section in layer n+1 is the direct reverse of a tool path section in an adjacent layer region of adjacent layer n.

12. The method according to claim 1, wherein dividing the three dimensional structure into a plurality of sub-regions includes partitioning the three dimensional structure into one or more volume structures prior to defining the build layers.

13. The method according to claim 1, wherein the build layers include curved surfaces.

14. The method according to claim 1, wherein the tool path is defined so as to optimize a printing time for forming the three dimensional structure.

15. The method according to claim 1, wherein the tool path is defined so as to minimize a number of path intersections along the tool path.

16. The method according to claim 1, wherein the tool path is defined so as to optimize a number of layer crossings to enhance a strength of the overall build of the three dimensional structure.

17. A method of controlling a printing tool in an additive manufacturing process, the method including:
   executing, by a computer processor, a printing tool control algorithm generated by the method according to claim 1; and
   generating, in response to the printing tool control algorithm, electrical signals to control a printing tool to move along a tool path to form a predefined three dimensional structure.

18. The method according to claim 17, wherein the printing tool includes a cold spray gun that is held in an operative position by a robotic arm.

19. A computer system configured to implement the method according to claim 1.

20. A non-transitory computer-readable storage medium comprising instructions which, when executed by a computer, cause the computer to carry out the method according to claim 1.

21. An additive manufacturing system including:
- a computer processor configured to execute a printing tool control algorithm generated by the method according to claim 1; and
- a printing tool responsive to electrical signals generated by the computer processor based on the printing tool control algorithm, the electrical signals configured to move the printing tool along a tool path to form a predefined three dimensional structure.

22. The method according to claim 1, wherein the tool path comprises a plurality of tool path sections for different layer regions which are combined to define a single tool path.

23. The method according to claim 22, wherein at least some tool path sections are connected by one or more loop paths which loop around an external contour of the structure.

24. The method according to claim 1, wherein some or each of the build layers are partitioned into one or more layer regions, and wherein at least some of the layer regions are determined based on elements representing one or more of:
- a node in a Hamiltonian path problem;
- sub-areas of the structure;
- a layer that need to be infilled before other regions;
- connecting paths between infill sections; or
- internal or external contour loop paths.

* * * * *